(12) United States Patent
Shimano

(10) Patent No.: US 10,911,643 B2
(45) Date of Patent: Feb. 2, 2021

(54) IMAGING DEVICE MODULATING INTENSITY OF LIGHT WITH GRATING PATTERN

(71) Applicant: HITACHI, LTD., Tokyo (JP)

(72) Inventor: Takeshi Shimano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/078,751

(22) PCT Filed: Feb. 26, 2016

(86) PCT No.: PCT/JP2016/055741
§ 371 (c)(1),
(2) Date: Aug. 22, 2018

(87) PCT Pub. No.: WO2017/145348
PCT Pub. Date: Aug. 31, 2017

(65) Prior Publication Data
US 2019/0020789 A1    Jan. 17, 2019

(51) Int. Cl.
*H04N 5/225* (2006.01)
*H04N 5/238* (2006.01)
(Continued)

(52) U.S. Cl.
CPC ......... *H04N 5/217* (2013.01); *G02F 1/13306* (2013.01); *H04N 5/2254* (2013.01);
(Continued)

(58) Field of Classification Search
CPC ...... H04N 5/217; H04N 5/2254; H04N 5/238; H04N 1/40; G02F 1/13306; G02F 2201/30
See application file for complete search history.

(56) References Cited

U.S. PATENT DOCUMENTS 10,423,002 B2 * 9/2019 Shimano ............ G02B 27/4205
2009/0303559 A1 * 12/2009 Rosen ................. G03H 1/0443
359/9

(Continued)

FOREIGN PATENT DOCUMENTS

CN    1116719 A    2/1996
CN    1367399 A    9/2002
(Continued)

OTHER PUBLICATIONS

Japanese Office Action received in corresponding Japanese Application No. 2018-501517 dated Oct. 29, 2019.
(Continued)

*Primary Examiner* — Hung H Lam
(74) *Attorney, Agent, or Firm* — Mattingly & Malur, PC

(57) ABSTRACT

An image sensor has a plurality of pixels arranged in an array on an imaging surface and converts a captured optical image into an image signal. A modulator is provided on a light receiving surface of the image sensor and modulates the light intensity using a grating pattern. An image processor performs image processing of the image signal output from the image sensor. The modulator has a grating substrate and a first grating pattern is formed on a first side of the grating substrate adjacent to a light receiving side of the image sensor. The grating pattern is composed of a plurality of concentric circle patterns. Each concentric circle pattern has concentric circles having a pitch which becomes smaller in inverse proportion to the distance from the center thereof. The plurality of concentric circle patterns do not overlap with each other in the grating pattern.

12 Claims, 18 Drawing Sheets

(51) Int. Cl.
*H04N 5/217* (2011.01)
*H04N 5/232* (2006.01)
*G02F 1/133* (2006.01)
*H04N 1/40* (2006.01)

(52) U.S. Cl.
CPC ............ *H04N 5/232* (2013.01); *H04N 5/238* (2013.01); *G02F 2201/30* (2013.01); *H04N 1/40* (2013.01)

(56) References Cited

U.S. PATENT DOCUMENTS

| | | | |
|---|---|---|---|
| 2010/0066812 | A1 | 3/2010 | Kajihara et al. |
| 2012/0232832 | A1* | 9/2012 | Zhang ............... G01P 15/18 702/141 |
| 2014/0253781 | A1 | 9/2014 | Gill et al. |
| 2015/0036084 | A1* | 2/2015 | Srivastava ....... G02F 1/133753 349/96 |
| 2015/0219808 | A1* | 8/2015 | Gill .................. H04N 5/2254 348/335 |
| 2017/0272669 | A1* | 9/2017 | Tuempner ............. H04N 5/378 |
| 2018/0095200 | A1* | 4/2018 | Nakamura ........... G02B 5/1842 |
| 2018/0166489 | A1* | 6/2018 | Sao ..................... H04N 5/365 |

FOREIGN PATENT DOCUMENTS

| | | |
|---|---|---|
| CN | 101443689 A | 5/2009 |
| CN | 104006765 A | 8/2014 |
| CN | 105008969 A | 10/2015 |
| JP | H01-242033 A | 9/1989 |
| JP | 2009-544036 A | 12/2009 |
| JP | 2013225417 A | 10/2013 |
| JP | 2014-521122 A | 8/2014 |
| WO | 2008/069077 A1 | 6/2008 |

OTHER PUBLICATIONS

Luminex Trading, Inc., "Holoeye Photonics AG", Nov. 18, 2009, URL: https://web.archive.org/web/20091118164616/http://www.luminex.co.jp/maker/Holoeye_Photonics_AG.html.
International Search Report of PCT/JP2016/055741 dated May 24, 2016.
Chinese Office Action received in corresponding Chinese Application No. 201680082565.6 dated Jan. 3, 2020.
Chinese Office Action received in corresponding Chinese Application No. 201680082565.6 dated Jun. 3, 2020.
Japanese Office Action received in corresponding Japanese Application No. 2018-501517 dated Oct. 6, 2020.
Phase-shift digital holography; Ichirou Yamaguchi; vol. 22. No. 16, Aug. 15, 1997; pp. 1268-1270.

* cited by examiner $$\delta = t \tan \theta$$

Focus position specification input (a) FRONT SIDE GRATING    (b) BACK SIDE GRATING

IMAGING DEVICE MODULATING INTENSITY OF LIGHT WITH GRATING PATTERN

TECHNICAL FIELD

The present invention relates to an imaging device, and in particular to a technique for miniaturizing an imaging device.

BACKGROUND ART

A camera installed in a smartphone and an in-vehicle camera for 360° sensing, needs miniaturization. According to US2014/0253781A (PTL 1), it is written that a special diffraction grating substrate is attached to an image sensor which obtains the image of the outside world by obtaining the incident angle of the incident light by inverse problem calculation from the projection pattern generated by the light passing through the diffraction grating substrate on the sensor without a lens.

According to US2015/0219808A (PTL 2), it is described that a concentric grating pattern having a pitch which becomes smaller from the center toward the outside is used as the diffraction grating substrate.

PTL 1: U.S. Patent Application Publication No. 2014/0253781 A

PTL 2: U.S. Patent Application Publication No. 2015/0219808 A

SUMMARY OF INVENTION

Technical Problem

In PTL 1 described above, the problem is that the pattern of the diffraction grating to be formed on the upper side of the substrate which is attached to the image sensor is a special grating pattern such as a spiral shape and the calculation for solving the inverse problem for reproducing the image becomes complicated from the projection pattern received by the sensor.

In PTL 1 described above, since the diffraction grating in which the concentric circular grating patterns overlap each other is used, there is a concern that the transmissivity decreases and mutual concentric circular grating patterns interfere with each other, leading to an increase in noise of the reproduced image.

An object of the present invention is to provide an easy technique for detecting the angle of incidence of light and to provide an imaging device which reduces a reduction in light utilization efficiency at that time and does not generate interference noise of mutually concentric circular grating patterns.

Solution to Problem

One of the representative imaging apparatuses of the present invention for solving the above the problem, for example, A single concentric grating pattern in which the pitch becomes smaller inversely proportional to the distance from the center is formed on the object side of the substrate to be attached to the sensor and the light transmitted through it is again modulated by another concentric grating pattern in which the pitch becomes smaller inversely proportional to the distance from the center, and an image of the external object is obtained from the two-dimensional Fourier transform image of the modulated image.

According to the present invention, an external object image can be obtained by a simple operation such as Fast Fourier Transform (FFT). Further, it is possible to reduce the decrease in transmittance of light and to eliminate the interference noise of the mutually overlapping concentric circular grating patterns remaining in the reproduced image. Since it does not use a lens, it is also effective for maintenance free vehicle cameras and surveillance cameras that are concerned about deterioration of image quality due to aged deterioration and misalignment of lenses. The problems, configurations, and effects other than those described above will be clarified by the description of the embodiments below.

DESCRIPTION OF EMBODIMENTS

Embodiments are explained with respect to the figures.

Embodiment 1

Figure 1:
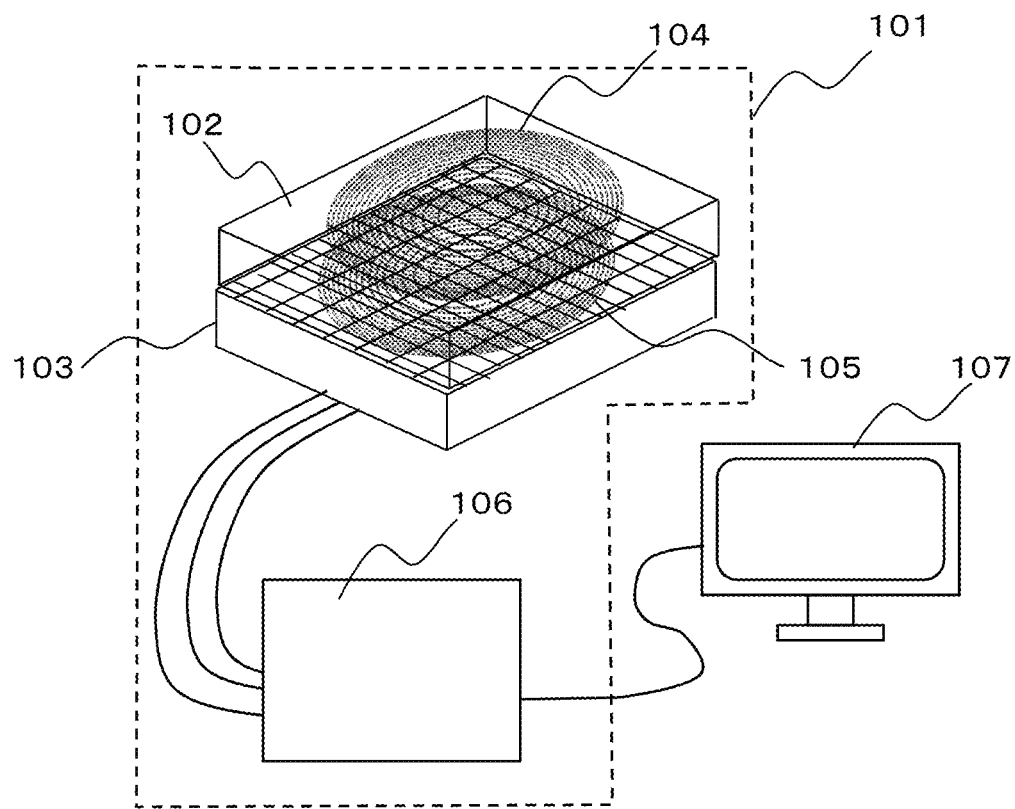
FIG. 1 is a diagram illustrating a basic example of the present invention.

FIG. 1 is a basic configuration diagram of the present invention. The imaging device 101 includes a double-sided grating substrate 102, an image sensor 103, and an image processing circuit 106. The double-sided grating substrate 102 is fixed in close contact with the light receiving side of the image sensor 103, and on the front side of the double-sided grating substrate 102, concentric circles having a grating interval (pitch) narrow in inverse proportion to the radius from the center toward the outside shaped grating pattern 104 is also formed. A similar grating pattern 105 is also formed on the back side of the image sensor 103 which is in contact with the light receiving side. The intensity of light passing through these grating patterns is modulated by the grating pattern. The transmitted light is received by the image sensor 103, and the image signal is subjected to image processing by the image processing circuit 106 and output to the monitor display 107 or the like. In a usual imaging device, a lens for forming an image is required in front of the sensor, but in the present invention, it is possible to make an image of an external object without a lens. In this case, the concentric circular grating pattern 104 has no other intersecting grating pattern in each ring pattern constituting the concentric circle, so no unnecessary interference between the grating patterns occurs, and it is possible to suppress a decrease in light utilization efficiency it can.

Figure 2:
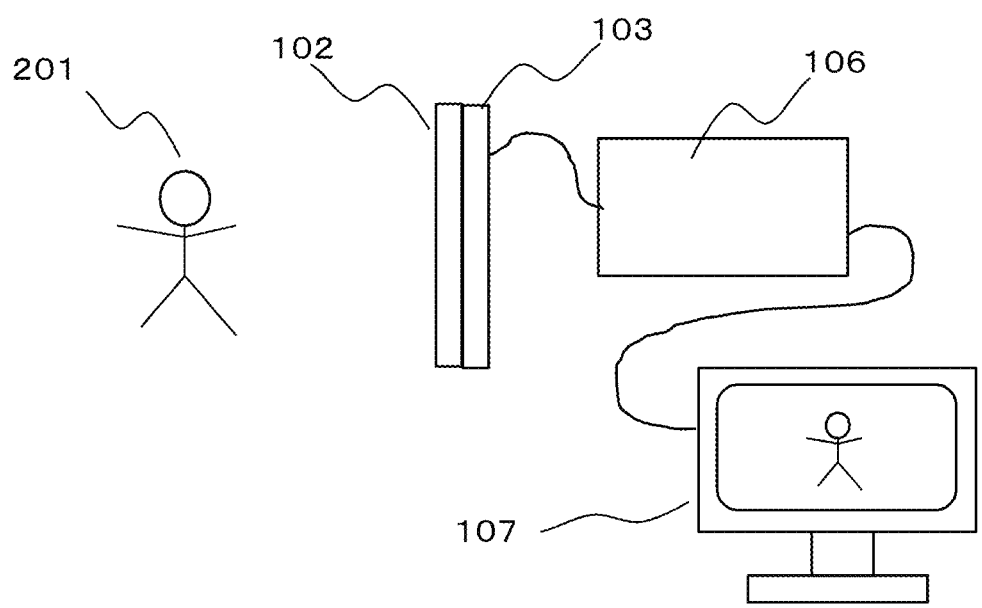
FIG. 2 is a diagram showing a state of taking an image of an object outside according to a basic embodiment of the present invention.

FIG. 2 shows an illustration of capturing the subject 201 by the imaging device of FIG. 1 and outputting it to the monitor display 107. And the grating plane of the double-sided grating substrate 102 faces the subject 201 so as to photograph it.

Figure 17:
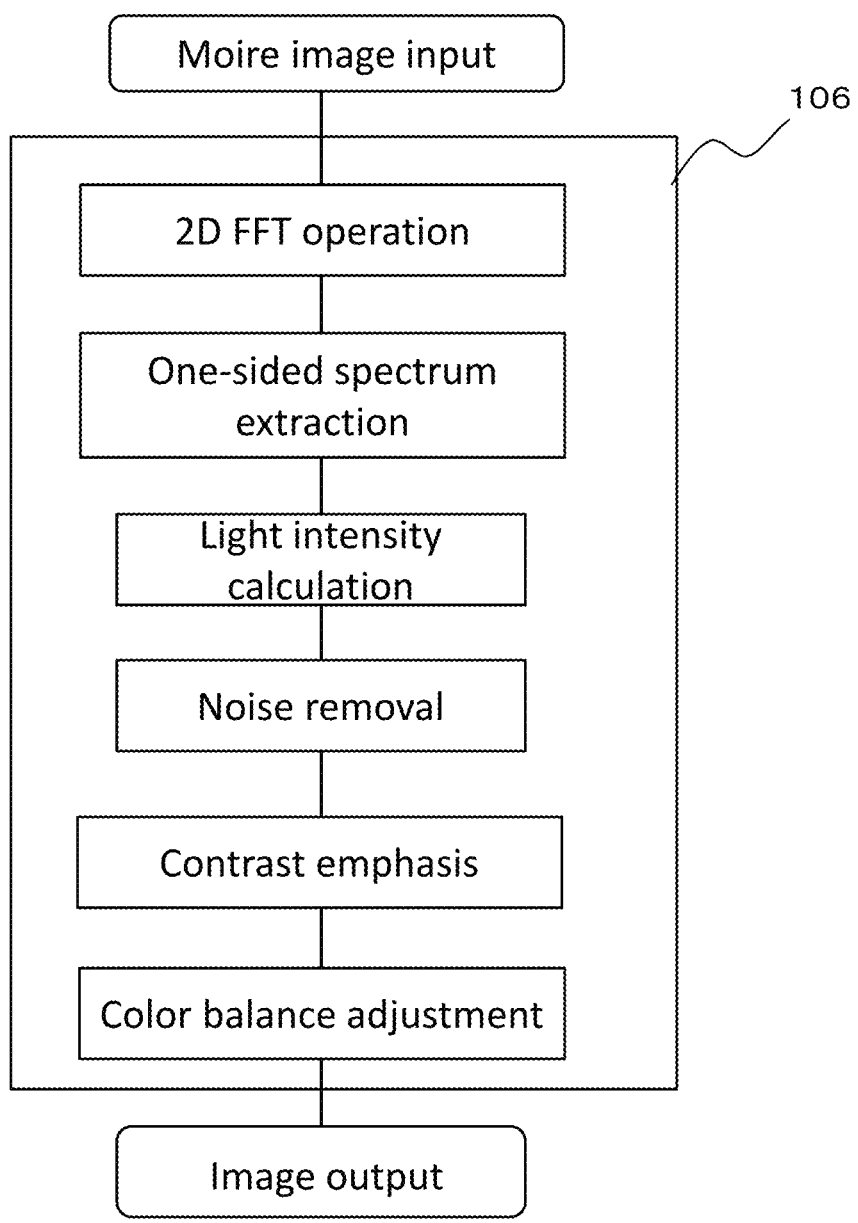
FIG. 17 is a block diagram of the image processing circuit of embodiment 1.

FIG. 17 is a block diagram showing the processing contents of the image processing circuit 106. For the Moire fringe image to be input, a two-dimensional FFT operation is performed for each color RGB component to obtain a frequency spectrum. Data of one side frequency is cut out and an intensity calculation is performed. Further, noise removal, contrast emphasis processing and the like are performed on the obtained image, the color balance is adjusted, and output as a photographed image.

The imaging principle will be described below. First, a concentric grid pattern in which the pitch becomes smaller in inverse proportion to the radius from the center outward is defined as follows. Let us assume a case of a spherical wave, close to a plane wave, and a plane wave, used as a reference light, interfere with each other in a laser interferometer or the like. When the radius from the reference coordinate of the center of the concentric circle is r and the phase of the spherical wave is $\varphi(r)$, this can be expressed as Equation 1 by using the coefficient $\beta$ which determines the magnitude of the curvature of the wavefront.

$$\phi(r)=\beta r^2 \quad (1)$$

As for the spherical wave, it is expressed by the square of the radius r and the spherical wave is close to a plane wave, so it can be approximated using only the lowest order of expansion. When plane waves are caused to interfere with light having this phase distribution, the intensity distribution of the interference fringes as shown in Equation 2 is obtained.

$$I(r)=\tfrac{1}{4}|\exp i\phi(r)+1|^2=\tfrac{1}{2}(1+\cos \phi) \quad (2)$$

$$=\tfrac{1}{2}(1+\cos \beta r^2)$$

This is a concentric stripe with a bright line at the radial position satisfying Equation 3.

$$\phi(r)=\beta r^2=2n\pi(n=0,1,2,\Lambda) \quad (3)$$

Assuming that the pitch of the stripe is p, Equation 4 is obtained.

$$p\frac{d}{dr}\phi(r) = 2p\beta r = 2\pi \quad (4)$$

$$p(r) = \frac{\pi}{\beta r}$$

It turns out that the pitch narrows in inverse proportion to the radius. Such stripes are called Fresnel zone plates.

A grating pattern having a transmittance distribution proportional to the intensity distribution is used as the lattice patterns 104 and 105 shown in FIG. 1.

Figure 3:
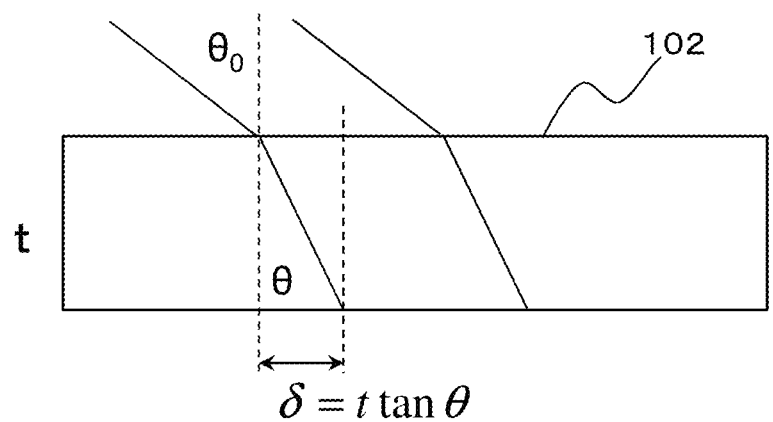
FIG. 3 is a diagram for explaining that the projection of an image from the grating substrate's front side to the back side by obliquely incident parallel light causes in-plane shift.

Assuming that parallel light enters the substrate having the thickness t with such a grating formed on both sides at an angle $\theta_0$ as shown in FIG. 3, light whose geometrical optics is multiplied by the transmittance of the grating of the front side with the refraction angle in the substrate as $\theta$ is incident on the back side with a deviation of $\delta=t\cdot\tan\theta$. And, assuming that the centers of the two concentric circle gratings are aligned, the transmittance of the grating of the back side is multiplied by shifting by $\delta$. In this case, intensity distribution expressed by Equation 5 is obtained.

$$I(x, y)I(x+\delta, y) = \frac{1}{4}\{1 + \cos\beta(x^2 + y^2)\}\{1 + \cos\beta((x + \delta)^2 + y^2)\} \quad (5)$$

$$= \frac{1}{8}\{2 + 4\cos\beta(r^2 + \delta x)\cos\beta\delta x +$$

$$\cos 2\beta(r^2 + \delta x) + \cos 2\beta\delta x\}$$

It can be seen that the fourth term of this expansion formula creates straight striped patterns at equal intervals in one overlapping area in the direction of the shift of the two gratings. Stripes that occur at relatively low spatial frequencies due to the superimposition of such stripes and fringes are called moire fringes. Such straight stripes at equal intervals produce a sharp peak in the spatial frequency distribution obtained by the two-dimensional Fourier transform of the detected image. It is possible to obtain the value of δ, that is, the incident angle θ of the light beam from the value of the frequency. It is obvious that such moire fringes uniformly spaced on the whole surface occur at the same pitch regardless of the direction of deviation because of the symmetry of the concentric grid arrangement.

It is thought that it is impossible to obtain uniform fringes on the whole surface with other grating patterns, because such a stripe is obtained by forming the grating pattern with the Fresnel zone plate. Even in the second term in the equation, it can be seen that fringes modulated by Moiré fringes are generated in the Fresnel zone plate, but since the frequency spectrum of the product of the two fringes is a convolution of each Fourier spectrum, a sharp peak is not obtained. From the Equation 5, only the component having a sharp peak is extracted as shown in Equation 6.

$$I(x,y)=\frac{1}{8}(2+\cos 2\delta\beta x) \tag{6}$$

And the Fourier spectrum is as shown in Equation 7;

$$F[I(x,y)]=\frac{1}{8}F[2+\cos 2\delta\beta x]$$

$$=\frac{1}{4}\delta(u,v)+\frac{1}{8}\delta(u+\delta\beta/\pi,v)+\frac{1}{8}\delta(u-\delta\beta/\pi,v) \tag{7}$$

Here, F represents the calculation of the Fourier transform, u and v are the spatial frequency coordinates in the x and y directions, and δ with the parentheses is the delta function. From this result, it can be seen that in the spatial frequency spectrum of the detected image, the peak of the spatial frequency of moire fringes occurs at the position of $u=\pm\delta\beta/\pi$.

Figure 4:
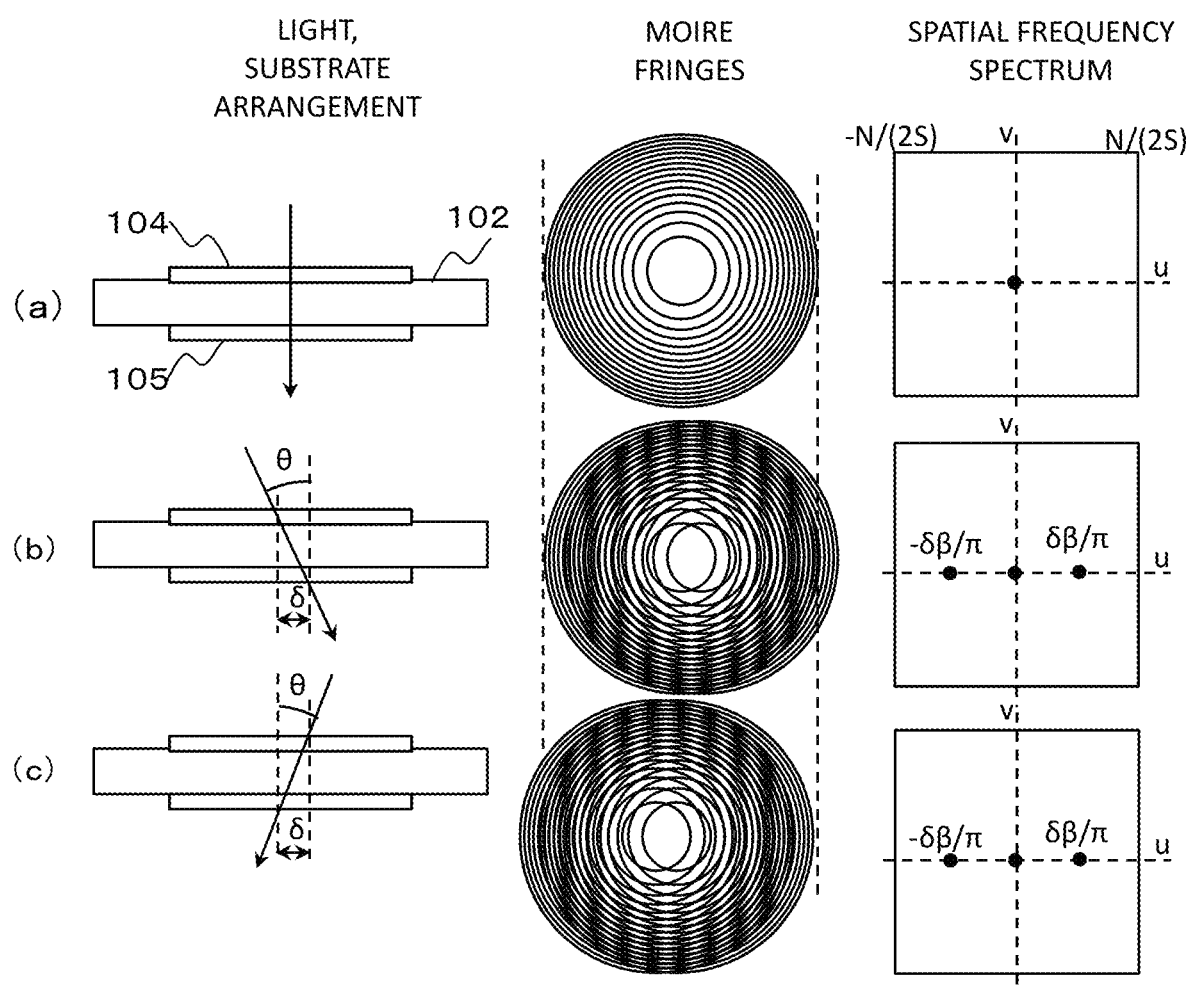
FIG. 4 is schematic diagram for explaining the generation of moire fringes and frequency spectrum when the grating axes of both sides of the grating substrate are aligned.

This state is shown in FIG. 4. The figure shows the layout of the ray and the substrate from the left, the moiré fringes, the schematic diagram of the spatial frequency spectrum, where the top row is (a) vertical incidence, the middle row is (b) when the ray is incident at angle θ from the left side, and the bottom row is (c) rays are incident at angle θ from the right side. The front side grating pattern 104 and the back side grating pattern 105 on the grating substrate 102 are aligned with each other. In (a), since the shadow of the front side grating pattern 104 and the shadow of the back side grating pattern coincide with each other, moire fringes do not occur. In (b) and (c), the same moire fringes occur because the deviation between the front side grating pattern 104 and the back side grating pattern is equal, the peak position of the spatial frequency spectrum also coincides, and it cannot be determined from the spatial frequency spectrum whether the incident angle of the light beam is (b) or (c).

Figure 5:
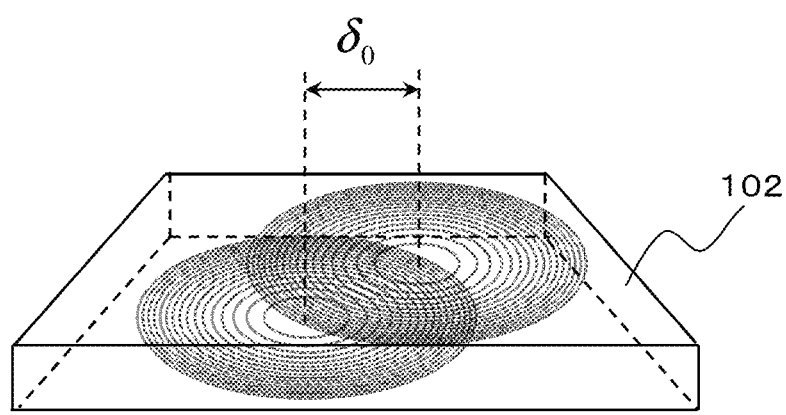
FIG. 5 is a schematic diagram in the case where the axes of the front side grating and the back side grating are arranged to be shifted from each other.

In order to avoid this, as shown in FIG. 5, the two gratings are shifted relative to the optical axis in advance so that the shadows of the two lattices overlap with each other even for light rays incident perpendicularly to the substrate It is necessary to keep it. When the relative shift of the shadows of the two lattices with respect to the vertical incidence plane wave on the axis is $\delta_0$, the deviation δ caused by the plane wave of the incident angle θ can be expressed as Equation 8.

$$\delta=\delta_0+t\tan\theta \tag{8}$$

At this time, the peak of the spatial frequency spectrum of moiré fringes of the ray of incidence angle θ is at the position of Equation 9 on the plus side of the frequency.

$$u=\frac{\delta\beta}{\pi}=\frac{1}{\pi}(\delta_0+t\tan\theta)\beta \tag{9}$$

Assuming that the size of the image sensor is S, the number of pixels in the x, y directions are both N, the spatial frequency spectrum of the discrete image by fast Fourier transform (FFT) changes from −N/(2S) to +N/(2S), the position is obtained in the range. Considering that the incident angle on the plus side and the incidence angle on the minus side are uniformly received from this, it is reasonable the spectral peak position of the moiré fringe due to the vertical incidence plane wave (θ=0) is the same as the origin (DC) position, for example, and the center position with respect to the frequency position at the end, that is, the spatial frequency position is expressed by Equation 10.

$$\frac{1}{\pi}\delta_0\beta=\frac{N}{4S} \tag{10}$$

Therefore, it is reasonable to set the relative center offset of the two gratings.

$$\delta_0=\frac{\pi N}{4\beta S} \tag{11}$$

Thus, it is reasonable to set the relative center offset of the two gratings to Equation 11.

Figure 6:
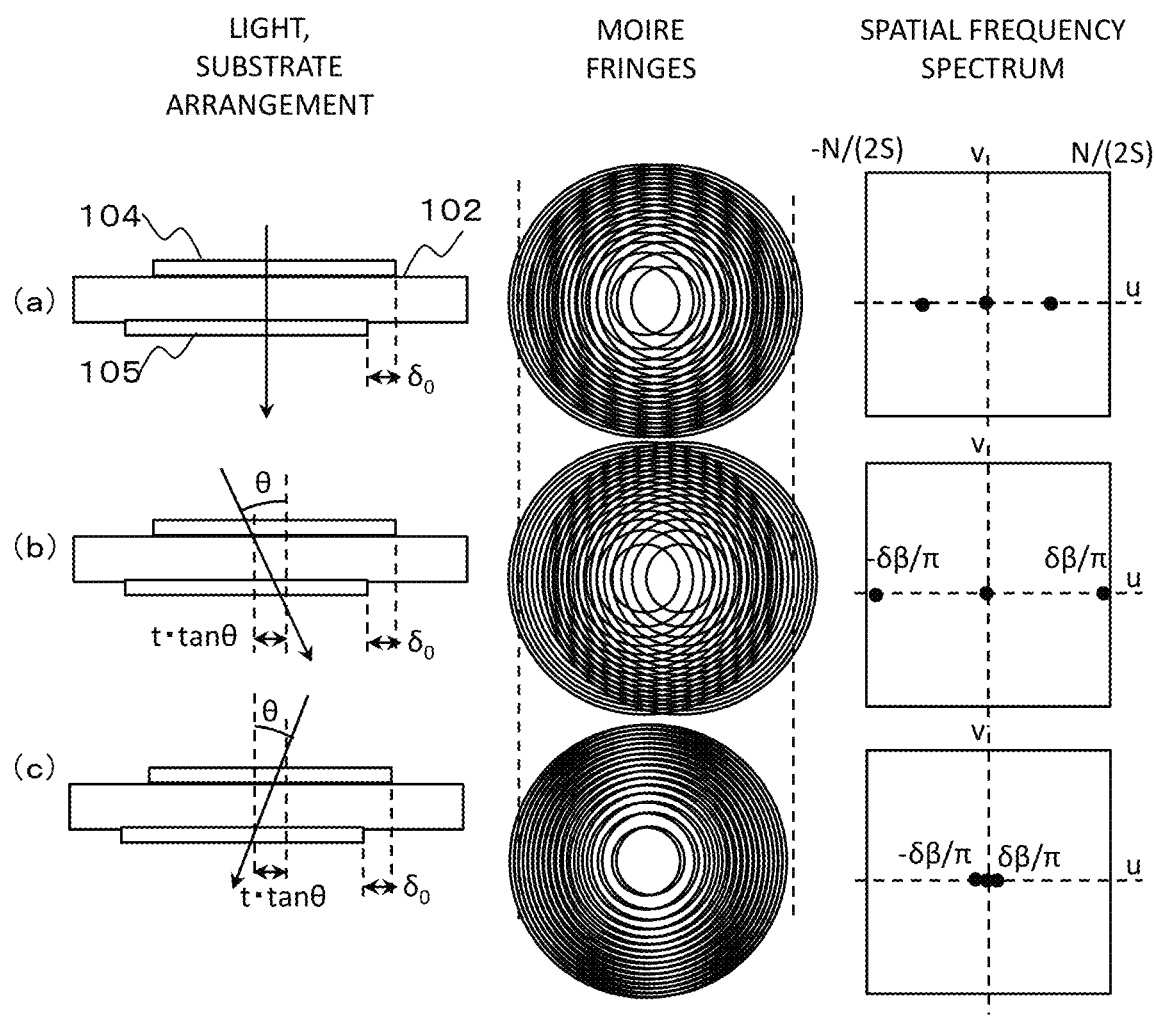
FIG. 6 is schematic diagram for explaining generation of moiré fringes and frequency spectrum in the case where grating of both sides of the grating substrate are shifted and arranged

FIG. 6 shows the arrangement of the light beam and the substrate, and the schematic diagram of the moire fringe and its spatial frequency spectrum when the front side grating pattern 104 and the back side grating pattern 105 are shifted in advance. In the same way as in FIG. 4, the arrangement of FIG. 6 shows the light beam and the substrate on the left side, the moiré stripe in the center row, and the spatial frequency spectrum on the right side. The upper row (a) shows when the ray is perpendicularly incident, the middle row (b) shows when light rays are incident from the left side at an angle θ, and the lower row shows the case (c) when light rays are incident at angle θ from the right side. Since the front side grating pattern 104 and the back side grating pattern 105 are arranged before being shifted by $\delta_0$ in advance, moiré fringes also occur in (a), and a peak appears in the spatial frequency spectrum. As described above, the shift amount $\delta_0$ is set so that the peak position appears at the center of the spectral range on one side from the origin. At this time, since the deviation δ becomes larger in (b) and becomes smaller in (c), the difference between (b) and (c) can be distinguished from the peak position of the spectrum unlike in FIG. 4. The spectral image of this peak is a bright point indicating a light flux at infinity, which is nothing but a captured image by the imaging device of the present invention.

Assuming that the maximum angle of incidence of parallel light that can be received is θ max;

$$u_{max}=\frac{1}{\pi}(\delta_0+t\tan\theta_{max})\beta=\frac{N}{2S} \tag{12}$$

From Equation 12, the maximum field angle that can be received by the imaging device of the present invention is given by Equation 13.

$$\tan\theta_{max} = \frac{\pi N}{4t\beta S} \quad (13)$$

From the analogy with imaging using ordinary lenses, it is considered that parallel light of the angle of view $\theta_{max}$ is received at the end of the sensor by focusing.

$$f_{eff} = \frac{S}{2\tan\theta_{max}} = \frac{2\beta t S^2}{\pi N} \quad (14)$$

The effective focal length of the imaging optical device of the present invention which does not use a lens is expressed by Equation 14, respectively.

As shown by equation 2, the transmittance distribution of the lattice is basically supposed to have a sinusoidal characteristic, but if such a component is present as the fundamental frequency component of the grating, it is conceivable the transmittance of the grating is binarized to change the duty of the grating region having high transmittance and the duty of low region, and increase the width of the high transmittance region to increase the transmittance.

In the above explanation, in both cases, only one incident angle is simultaneously incident light. However, in order for the present invention to actually function as a camera, we should assume that lights of a plurality of incident angles are incident at the same time. Such lights having a plurality of incident angles overlap the images of the plurality of front side grating pattern 104 at the time when they are incident on the back side grating pattern. If these mutually generate moiré fringes, there is a concern that it will become noise which hinders the detection of moiré fringes with the back side grating pattern which is a signal component. In practice, however, the superimposition of the images of the front side lattice 104 does not cause a peak of the moiré image, and only the overlap with the back side grating pattern will produce a peak. The reason will be explained below. First, it is a big difference that the overlapping of the shadows of the front side lattice 104 by the rays of a plurality of incident angles is a sum, not a product. With the overlap of the shadow of the front side grating pattern 104 due to the light of one incidence angle and the back side grating pattern 105, the light intensity distribution after passing through the back side grating pattern 105 is obtained by multiplying the intensity distribution of the light which is the shadow of the front side by the transmittance of the back side grating pattern 105. On the other hand, since the overlapping of the shadows caused by the lights having different angles incident on the front-side grating pattern 104 is the overlapping of the lights, it is not a product but a sum.

$$I(x,y)+I(x+\delta,y)=\tfrac{1}{2}\{1+\cos\beta(x^2+y^2)\}+\tfrac{1}{2}\{1+\cos\beta((x+\delta)^2+y^2)\}$$

$$=1+\cos\beta(r^2+\delta x)\cos\delta\beta x \quad (15)$$

Figure 7:
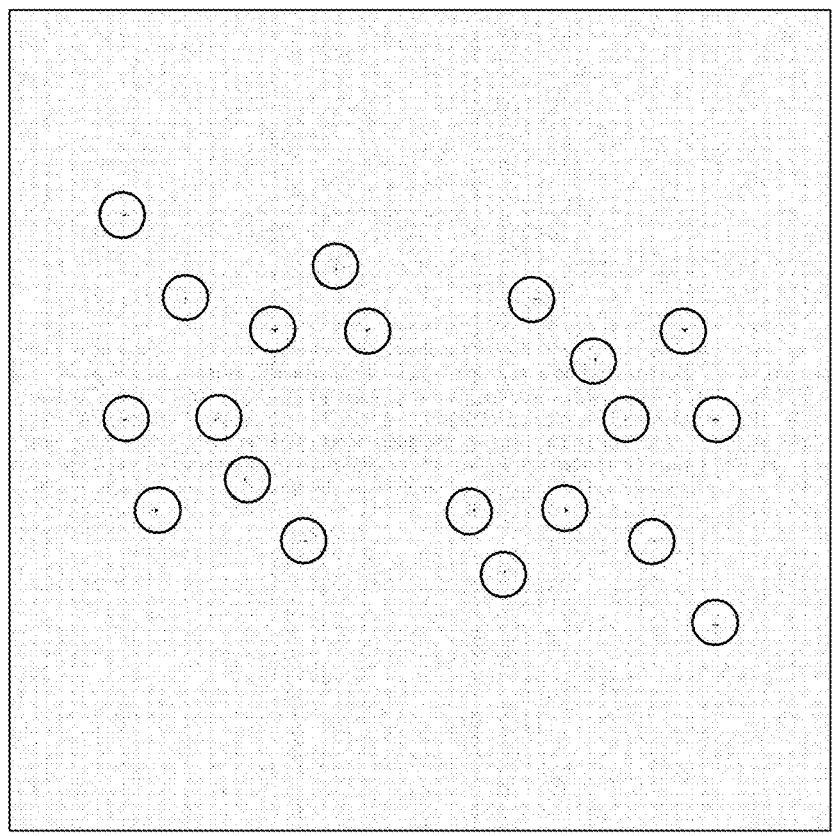
FIG. 7 is diagram showing calculation results of spatial frequency spectral image when irradiated with 10 lights in total including vertical incidence plane wave and plane waves with 9 different incident angles
Figure 8:
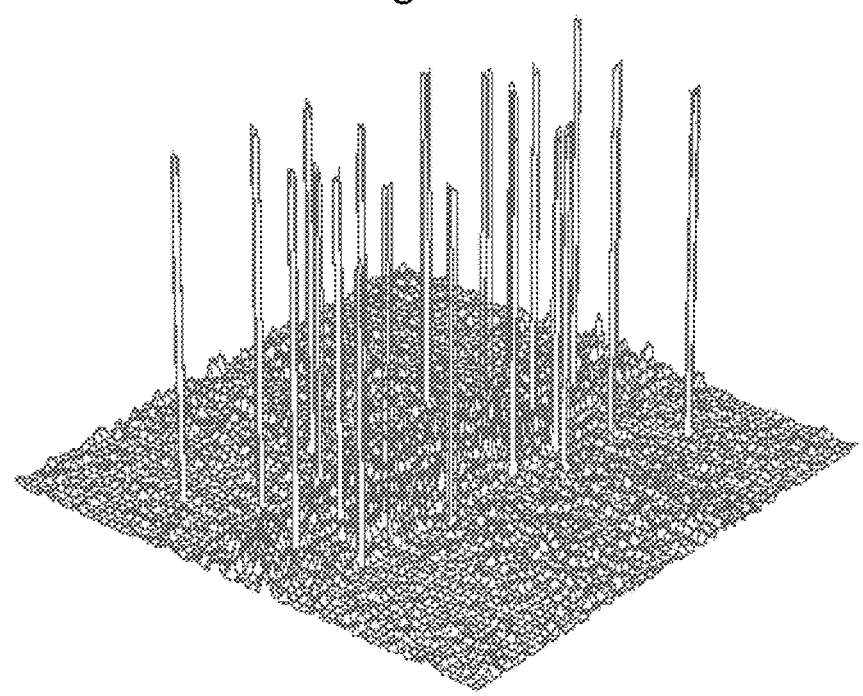
FIG. 8 is a diagram showing the calculation result of the spatial frequency spectral image when irradiated with a total of 10 lights including a vertical incident plane wave and plane waves with 9 different incident angles.

In the case of a sum, it becomes a distribution obtained by multiplying the distribution of the lattice of the original Fresnel zone plate by the distribution of the moiré fringes as shown by Equation 15. Therefore, since its frequency spectrum is represented by the overlap integral of each frequency spectrum, even if the spectrum of Moiré alone has a sharp peak, actually only the ghost of the frequency spectrum of the Fresnel zone plate will occur at that position. That is, a sharp peak does not occur in the spectrum. Therefore, even if light having a plurality of incident angles is entered, the spectrum of the moiré image detected is always only the moire of the product of the front side grating pattern 104 and the back side grating pattern 105, and as long as the back side grating pattern 105 is single, the peak is only a one for one incident angle. In order to confirm the principle, the results of the simulation performed are shown in FIGS. 7 and 8.

All of them are in the spectrum, on the condition that the sensor size is 20 mm, the viewing angle $\theta$ max=±70°, the incident side and exit side lattice coefficient $\beta$=50 (rad/mm 2), $\delta_0$=0.8 mm, the number of pixels is 1024×1024, the substrate thickness is 1 mm, the ratio is 1.5, on the condition that incident light with $\theta x$=50° and $\theta y$=30° and incident light with $\theta x$=−30° and $\theta y$=70° and $\theta x$=10°, $\theta y$=−20° incident light, incident light with $\theta x$=20°, $\theta y$=30°, incident light with $\theta x$=30°, incident light with $\theta y$=−40°, incident light with $\theta x$=−10°, $\theta y$=40°, Incident light at $\theta x$=−20°, $\theta y$=−30°, incident light at $\theta x$=−30°, $\theta y$=0° and incident light with $\theta x$=40° and $\theta y$=50° in total or 10 plural waves are incident. FIG. 7 is a black and white inverted image of the spectral image, and FIG. 8 is a diagram of the luminance of the spectral image. The original moiré image itself was also omitted because the grating pitch is also small and cannot be visually recognized even if it is displayed as the drawing of this specification. In the figure, the whole area of the spatial frequency spectral region with the center at the DC component and the periphery at ±N/2S is displayed. Since the DC component has a large value, it is removed by masking and only the peak component to be detected is displayed. Furthermore, since the peak width of the spectrum is narrow as it is, it is difficult to visually recognize, so the contrast is emphasized. Further, in FIG. 7, the position of the signal peak is displayed surrounded by circles. In the diagram of FIG. 8, since the drawn line cannot be displayed without passing through the peak as it is, the result of applying the averaging filter of the mesh size is displayed. In each case, basically, it is shown that 10 peaks can be detected as a total of 20 peaks on the positive and negative sides across the origin. In the present embodiment, the pitch of the outermost circumference of the grating pattern was about 6 µm and the effective focal length was 12.4 mm.

Figure 9:
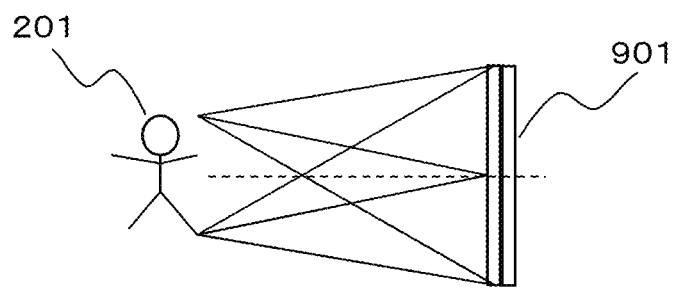
FIG. 9 is a diagram for explaining the angle that light from each point constituting an object makes with the sensor.

Here, the correspondence between the parallel light that has been explained so far and the light from the actual object will be described schematically with reference to FIG. 9. Strictly speaking, the light from each point constituting the subject 201 is incident as a spherical wave from a point light source onto the integrated grating sensor substrate 901 of the imaging apparatus of the present invention. At this time, when the Integrated grating sensor substrate 901 is sufficiently small or sufficiently far from the object, it can be considered that the incident angle of light illuminating the integrated grating sensor substrate 901 from each point is the same. From the relationship that the spatial frequency displacement $\Delta u$ of the moire fringe with respect to the minute angular displacement $\Delta\theta$ obtained from the equation (9) is 1/S or less, which is the minimum resolution of the spatial frequency of the sensor, the condition under which $\Delta\theta$ can be regarded as parallel light can be expressed as Equation 16.

$$\Delta u = \frac{1}{\pi}\beta t \Delta\theta \le \frac{1}{S} \quad (16)$$

$$\Delta\theta \le \frac{\pi}{S\beta t}$$

From this, for example, in the condition of the present embodiment $\Delta\theta$<0.18°, which is a condition that is possible if the sensor size of 20 mm is 6 m away from the object.

From the analogy of the above results, it can be seen that the imaging device of the present invention is capable of imaging on an object at infinity.

Embodiment 2

Figure 10:
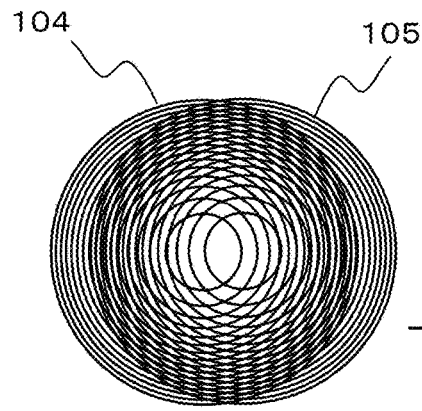
FIG. 10 is a diagram showing the spatial frequency spectrum in the case where two grating patterns are shifted in the horizontal direction.
Figure 10:
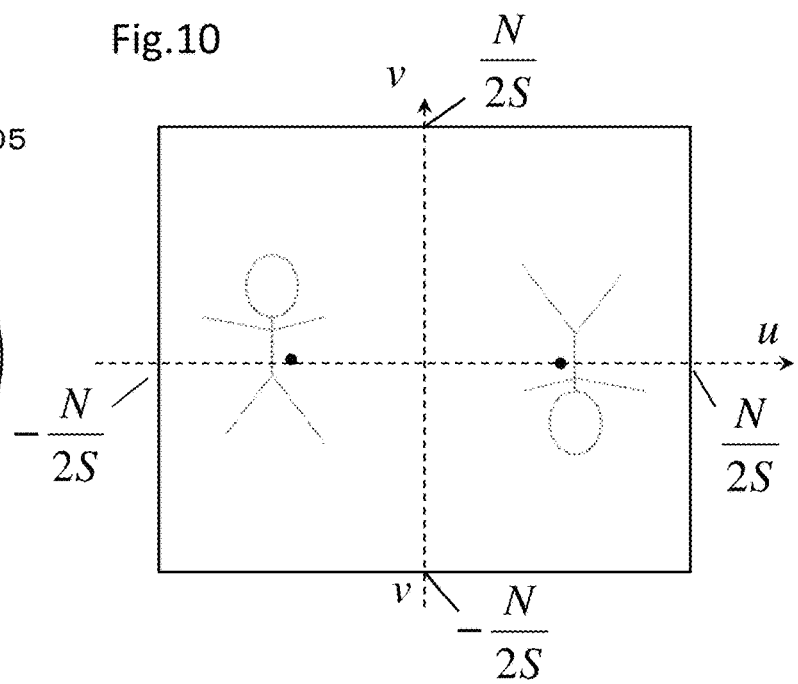
Figure 11:
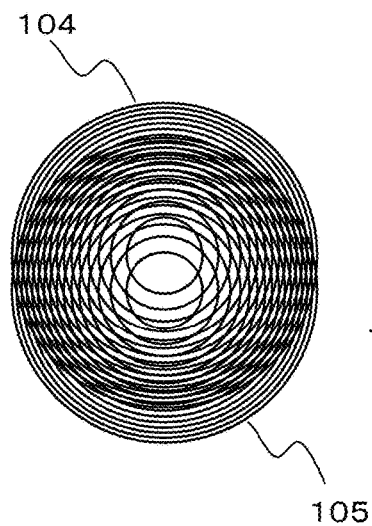
FIG. 11 is a diagram showing the spatial frequency spectrum in the case where two grating patterns are shifted in the vertical direction.
Figure 11:
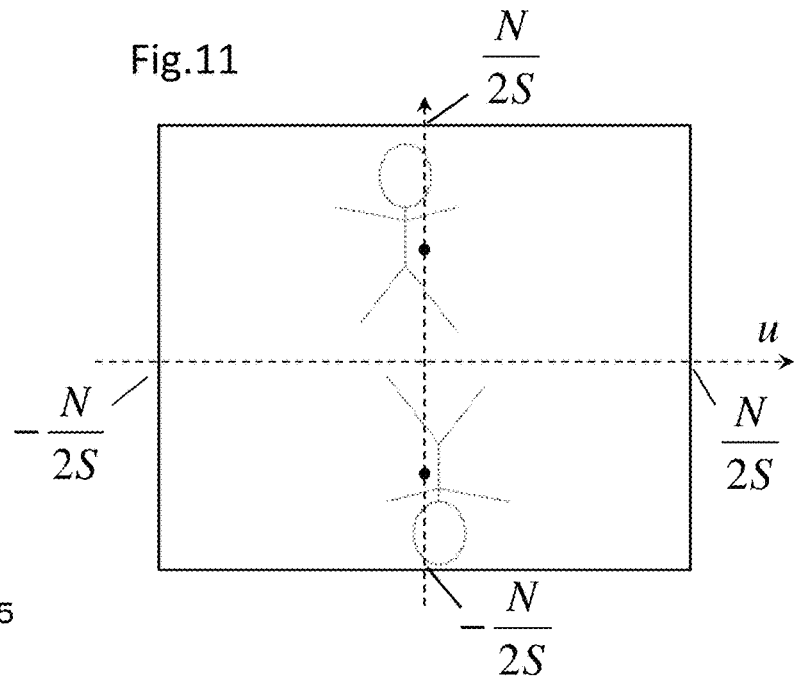

In the present embodiment, the case where the output image is landscape-long will be described. In the above-described embodiment, as shown in FIG. 10, the front side grating pattern 104 and the back side grating pattern 105 are shifted to the left and right. At this time, if the shape of the sensor is a square, and the pixel pitch is also the same in the x direction and the y direction, as shown on the right side of the figure, the spatial frequency spectrum of the sensor output is reproduced with the image being separated left and right within the frequency range of both x and y±N/S. However, at this point, the image is basically limited to a vertically long area. Generally, the image acquired by the camera is a landscape rectangle. Therefore, it is desirable to arrange it as shown in FIG. 11 as an arrangement suitable for it. At this time, the front side grating pattern 104 and the back side grating pattern 105 are vertically shifted, and the images formed in the spatial frequency space of the sensor output are separated upward and downward. In this way, the output image can be made horizontally long.

Embodiment 3

Figure 12:
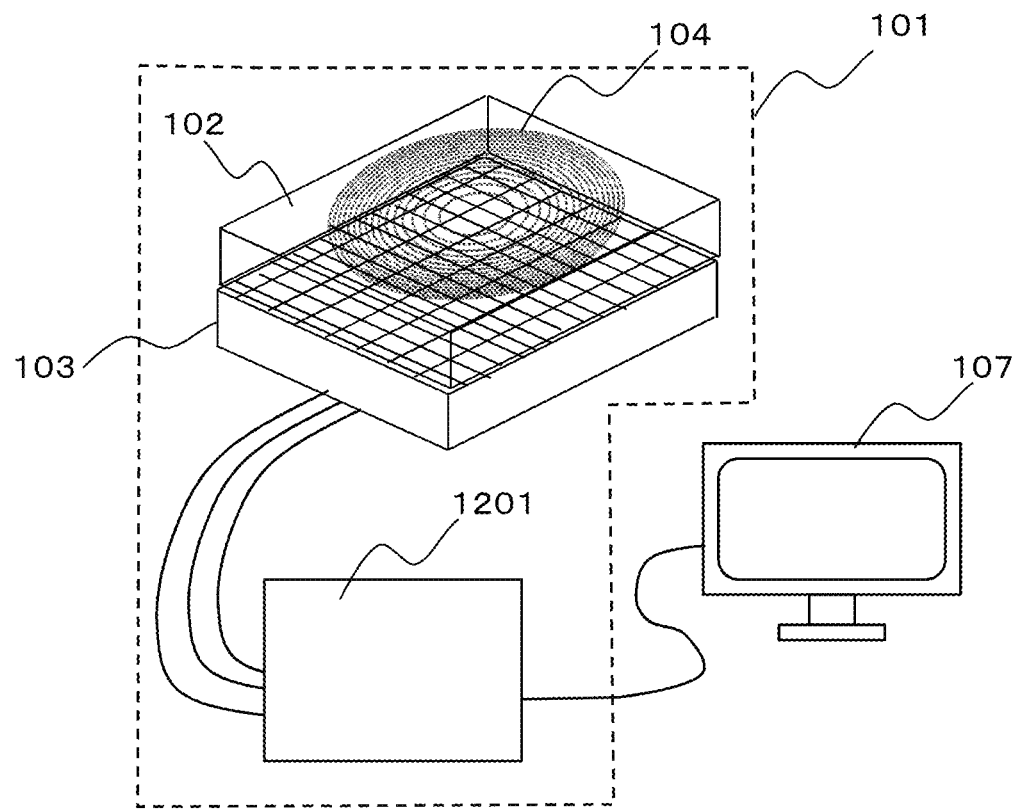
FIG. 12 is a diagram showing an embodiment in the case where the back side grating pattern is replaced with the sensor sensitivity distribution.
Figure 18:
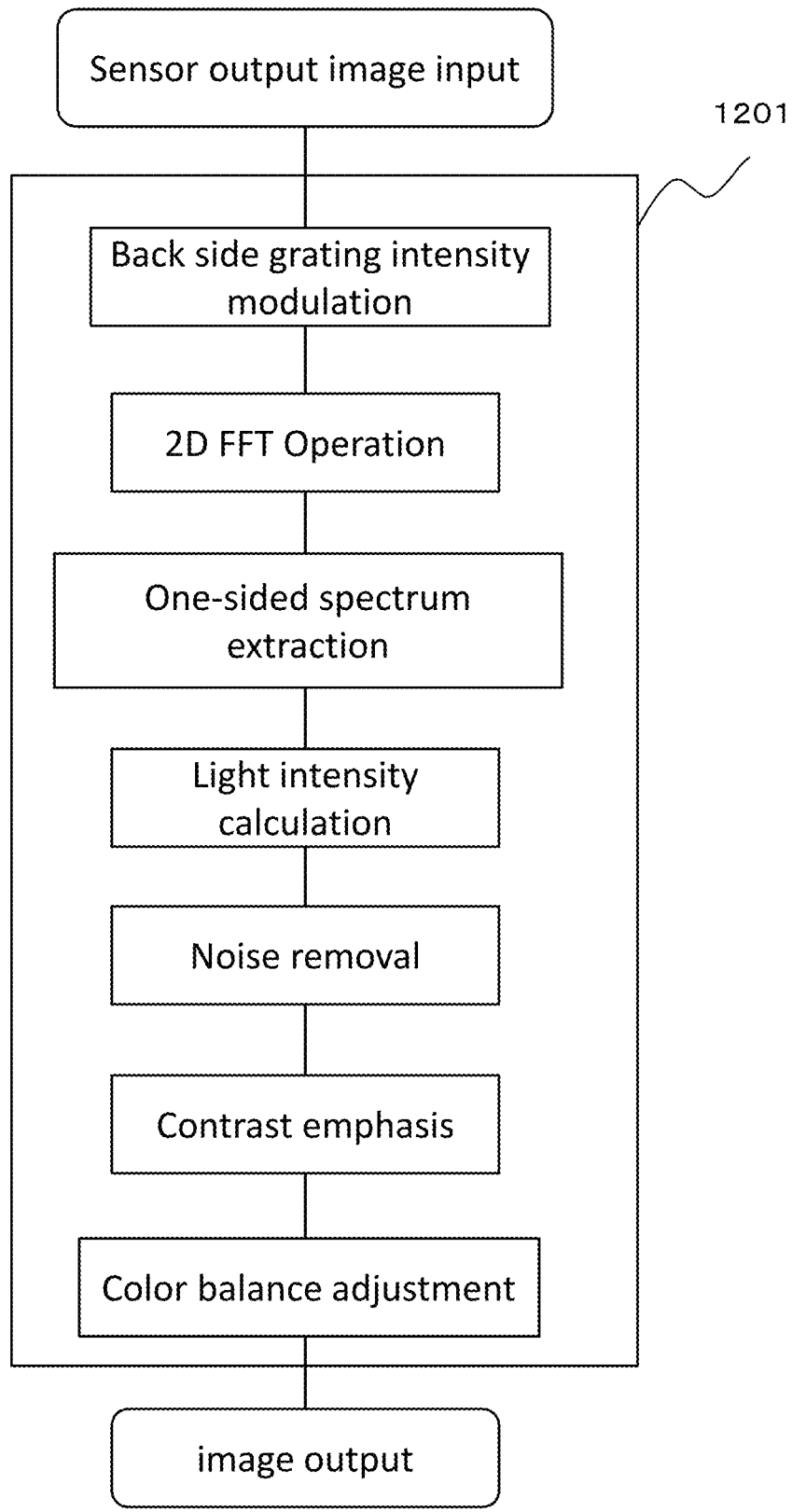
FIG. 18 is a block diagram of the image processing circuit of embodiment 3.

In the present embodiment, a case where a moiré fringe is virtually generated in a processed image will be described. In the above-described embodiment, the same grating pattern is arranged on the front side and the back side of the grating substrate so as to be shifted from each other, the angle of the incident parallel light is detected from the spatial frequency spectrum of the moire fringe to form an image. The difference between the present embodiment is that there is no back side grating pattern 105 in terms of the configuration and that the role of the back side grating pattern 105 is performed by the image processing unit. Since the grating pattern on the back side, closely attaching to the sensor, is an optical element that modulates the intensity of incident light by setting the sensitivity of the sensor effectively by taking account of the transmittance of the grating on the back side, Moire fringes can be caused virtually in the inside. FIG. 12 shows an embodiment in the case where the back side grating pattern 105 is not provided on the back side of the grating substrate. By doing so, one grating to be formed can be reduced, so that the manufacturing cost of the device can be reduced. However, at this time, it is necessary that the pixel pitch of the sensor is small enough to sufficiently reproduce the grating pitch or the grating pitch is rough enough to sufficiently reproduce at the pixel pitch of the sensor. In the case of forming the lattice on both sides of the substrate, it is not always necessary to resolve the pitch of the grating by the pixels of the sensor, since it is sufficient that only the moiré image can be resolved, and it is possible to determine the grating pitch independently of the sensor pitch. However, when reproducing a lattice with a sensor, the resolution of the lattice and the resolution of the sensor must be equal. As shown in FIG. 18, in the image processing circuit 1201, since processing of back side grating intensity modulation corresponding to a back side grating pattern for generating a moiré image to the sensor output is added, an intensity modulation circuit for performing this processing is also necessary.

Figure 13:
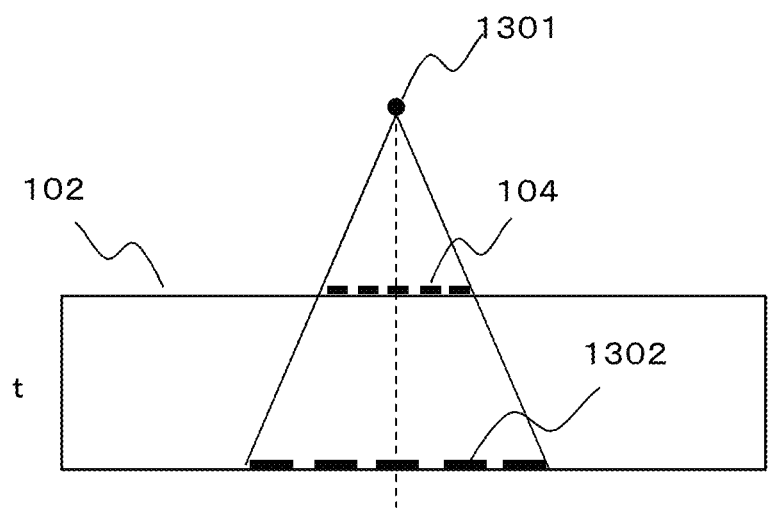
FIG. 13 is a diagram showing that when the object to be imaged is at a finite distance, the projection of the front side grating pattern onto the back side is enlarged from the front side grating pattern.

In this way, if the grating can be made variable, that is, the size of the concentric circles can be made variable, the detection light is not necessarily parallel light. As shown in FIG. 13, when a spherical wave from a point 1301 constituting an object illuminates the front side grating pattern 104 and its shadow 1302 is projected on the bottom, the image projected on the bottom is expanded almost evenly. Therefore, by directly multiplying the transmittance distribution of the bottom grating designed for the parallel light, a linear moire fringe at equal intervals does not occur. However, if the grating of the bottom side is enlarged in accordance with the shadow of the uniformly enlarged top side grating, linear moire fringes at equal intervals can be generated again for the enlarged shadow 1302. Thus, it is possible to selectively reproduce the light from the object point 1301 which is not necessarily at infinity. Therefore, focusing becomes possible.

Embodiment 4

Figure 14:
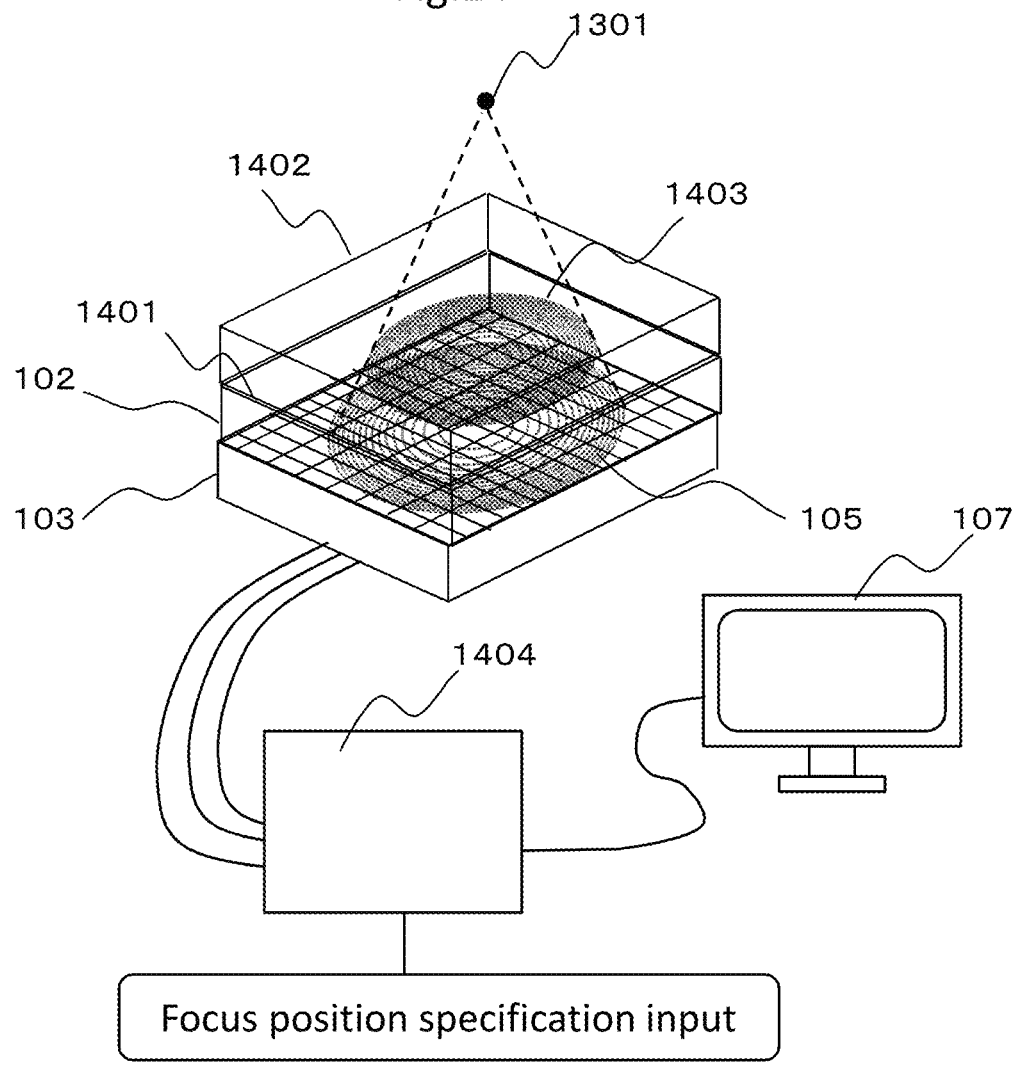
FIG. 14 is a diagram showing an embodiment in which the surface grating pattern is displayed with variable size by a liquid crystal element.
Figure 19:
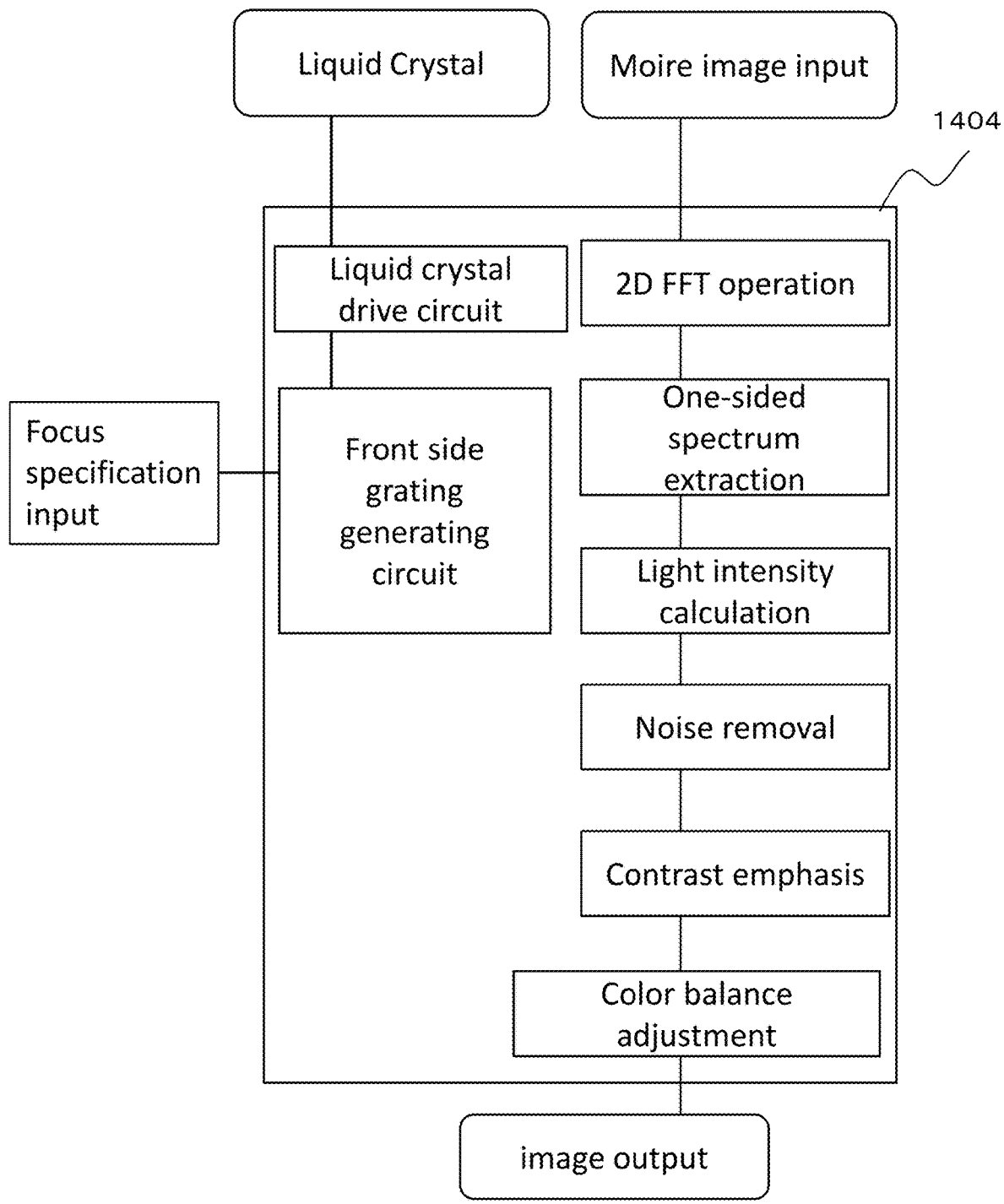
FIG. 19 is a block diagram of the image processing circuit of embodiment 4.

In this embodiment, a liquid crystal element is used for the grating of the front side substrate. As in the third embodiment, the grating of the front side substrate can also be made variable by using a liquid crystal element or the like. FIG. 14 is a diagram showing a state in which the variable grating 1403 on the front substrate is displayed by the liquid crystal element sealed with the liquid crystal substrate 1402 with the liquid crystal layer 1401 interposed therebetween. Transparent electrodes are formed on the liquid crystal substrate 1402 and the grating substrate 102, and an arbitrary lattice image can be displayed via electrodes (not shown). Light from an object point 1301 which is basically closer to infinity and has a finite distance is divergent light, then in order for the shadow of the front side grating pattern to be the same size on the back side grating pattern at the back side of grating substrate, it is only necessary to display it slightly shrinked on the front side. As shown in FIG. 19, a liquid crystal driving circuit is built in the image processing circuit 1404, and a front side grating pattern is generated according to an external focus specification input, and a front side grating pattern corresponding to an arbitrary focus position is displayed on the liquid crystal element. By using the liquid crystal element for the grating of the front side substrate in this manner, the grating of the front side substrate can be varied, that is, the size of the concentric circle can be made variable.

Embodiment 5

Figure 15:
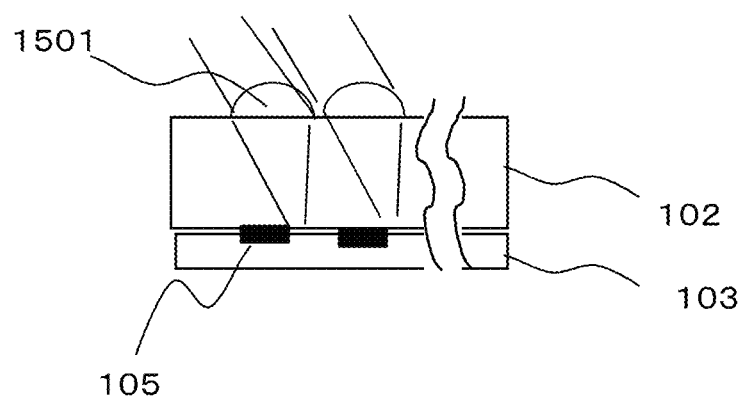
FIG. 15 is diagram showing an embodiment in the case where the front side grating is replaced with a cylindrical lens array

In this embodiment, as shown in FIG. 15, each grating of the incident side grating is a cylindrical lens 1501. All of the grating lines are formed in an array shape as cylindrical lenses. Thereby, it is possible to reduce the light amount loss by the shielding portion of the gray-scale grating and to improve the light utilization efficiency of the imaging device of the present invention.

Embodiment 6

Figure 16:
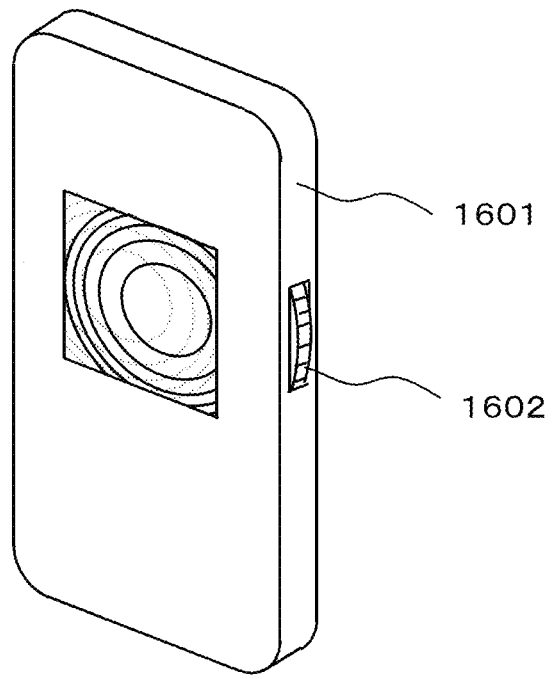
FIG. 16 is a diagram showing an embodiment of a smartphone on which an imaging device of the present invention is mounted

In the present embodiment, as shown in FIG. 16, an embodiment in the case where the imaging device of the present invention is mounted on a smartphone is shown. Since the aperture can be enlarged while keeping the imaging device thin, the effective focal length can be increased according to the equation 14, so that the aperture becomes small and the focal length becomes short as in the conventional smartphone camera. It is possible to solve the problem that the image is not blurred. A focus adjustment knob 1602 is attached to the object side, and it is possible to capture an image of an object at an arbitrary distance by making it variable according to focus designation for inputting a back side grating pattern to be displayed on a liquid crystal element incorporated as a unit with the sensor.

Embodiment 7

In the explanation of the principle of the first embodiment, it is explained that the sharp peak of the signal is obtained only in the frequency of the moire fringe of the fourth term in the Equation 5, but depending on the conditions of the optical system and the subject, The second and third terms become noise, which may affect the image quality of the reproduced image. Here, a configuration for removing these noises will be described.

Figure 24:
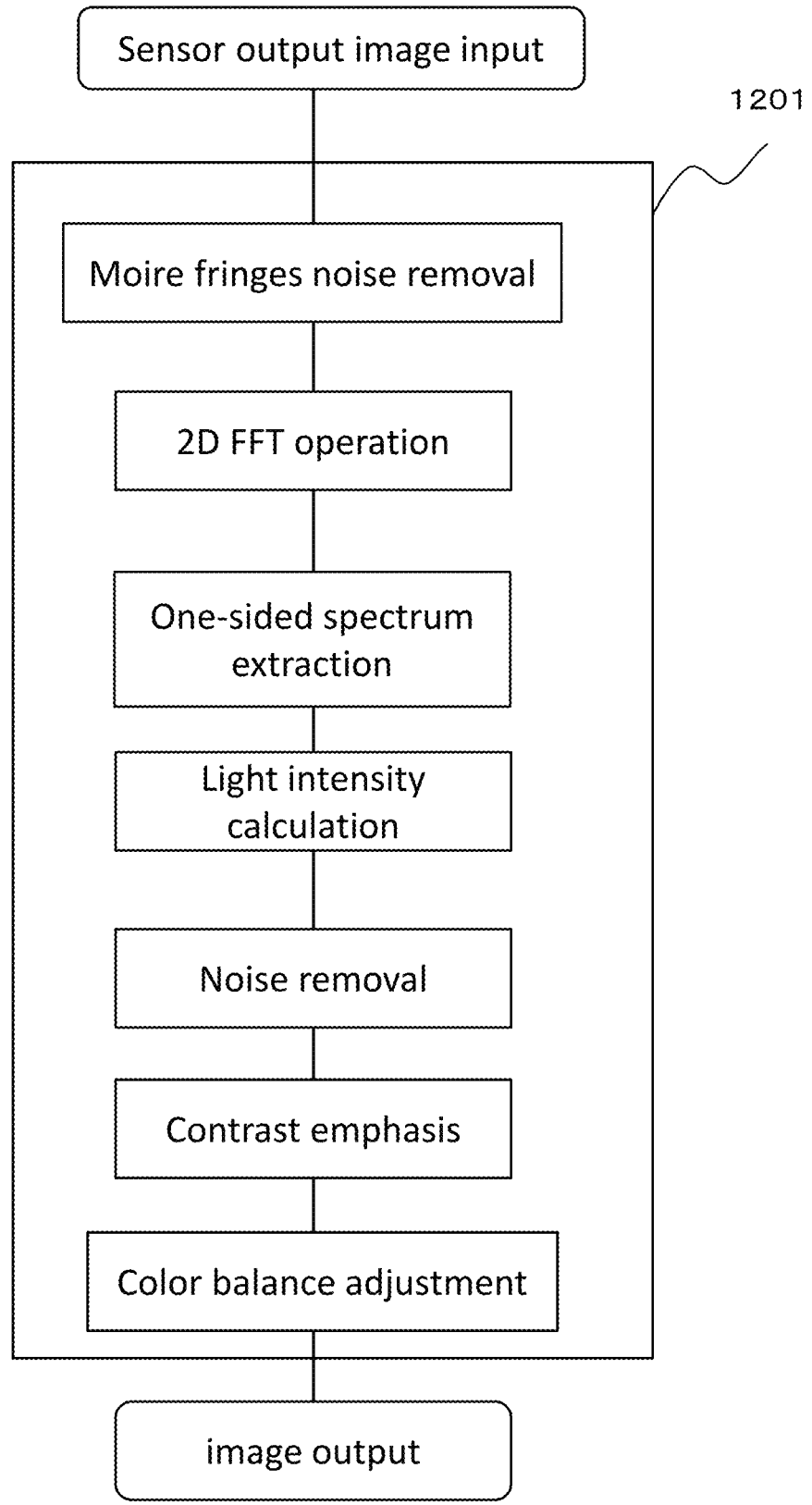
FIG. 24 is the image processing circuit block diagram of embodiment 7.

A block diagram of the process flow in the present embodiment is shown in FIG. 24, and in addition to FIG. 17, a process of removing Moire fringe noise is added.

Figure 20:
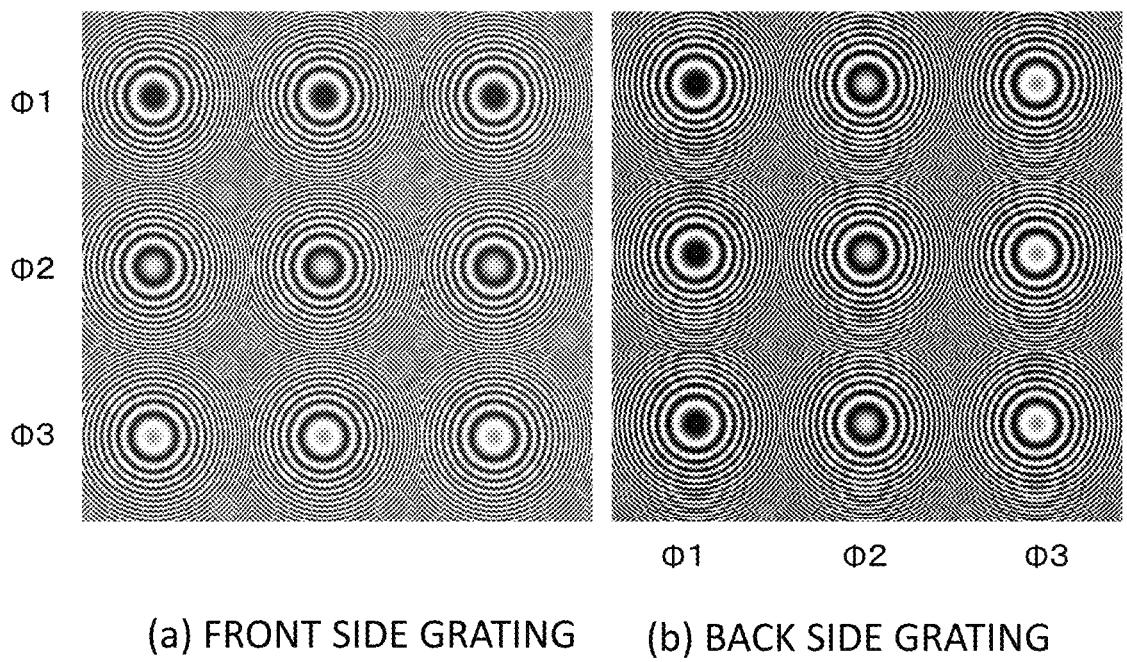
FIG. 20 is an illustration showing a grating pattern of an area of 3×3 division of embodiment 7.
Figure 21:
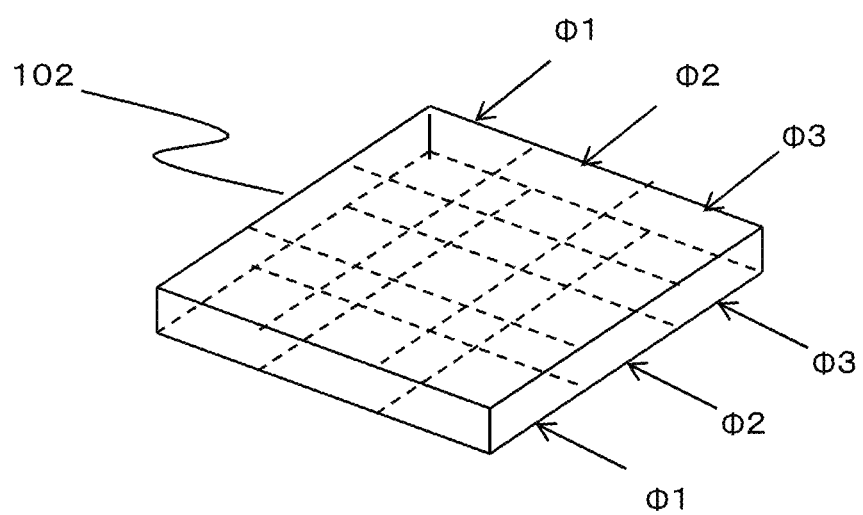
FIG. 21 is a diagram showing the arrangement of initial phases of both sides of a grating pattern of an area of 3×3 division in embodiment 7.

In order to remove noise, in the present embodiment, as shown in FIG. 20, the front side grating pattern 104 and the back side grating pattern 105 are formed in independent zone plates in an area divided into 3×3 or more. However, each zone plate is arranged without overlapping. At this time, in the front side grating pattern 104, the initial phases of the gratings are aligned to φ 1, φ 2, and φ 3, respectively, on the left side, the middle side, and the right side in the upper stage, the middle stage, the lower stage, and the backside grid 105. As shown in FIG. 21, these are arranged so that the phase of the front side grating pattern 104 and the phase of the back side grating pattern are overlapped with each other independently of each other in all combinations. At this time, the light intensity $I_s$ on the side of the sensor can be expressed by the Equation 17

$$I_S(x, y, \phi_F, \phi_B) = \left\{\sum_k I_k(x, y, \phi_F)\right\} I(x + \delta_0, y, \phi_B) \quad (17)$$

$$= \frac{1}{4}\left[\sum_k A_k\{1 + \cos\{\beta((x+\delta_k)^2 + y^2) + \phi_F\}\}\right]$$

$$\{1 + \cos\{\beta((x+\delta_0)^2 + y^2) + \phi_B\}\}$$

$$= \frac{1}{8}\sum_k A_k\{2 + 2\cos\{\beta(r^2 + 2x\delta_k) + \phi_F\} +$$

$$2\cos\{\beta(r^2 + 2x\delta_0) + \phi_B\} +$$

$$\cos\{2\beta(r^2 + (\delta_k + \delta_0)x) + \phi_F + \phi_B\} +$$

$$\cos\{2\beta(\delta_k - \delta_0)x + \phi_F - \phi_B\}\}$$

Ik is the light intensity distribution of the shadow of the front side grating pattern 104 by the kth point light source, and I is the transmittance distribution of the back side grating pattern 105. The initial phase φF of the front side grating pattern 104 and the initial phase φ B of the back side grating pattern 105 each take three values of φ 1, φ 2, φ 3 as described above. It is assumed that the kth point light source illuminating the front side grating pattern 104 emits light with the intensity of Ak and forms the shadow of the front side grating pattern 104 on the sensor with a deviation of δk. The second term in { } in the lower part of Equation 17 is the shadow of the front side grating, the third term is the intensity modulation of the back side grating, the fourth term is the sum of frequency components of the two gratings, the fifth term is the difference frequency and also a term of Moire fringes which is a signal component of the present invention. Therefore, it suffices to extract only the component having the added phase of φF−φB.

Expression (17) is expressed as Expression 18 by focusing on φF and φB;

$$I_S(\phi_F, \phi_B) = \frac{1}{8}\sum_k A_k \left\{ \begin{array}{l} 2 + 2\cos(\theta_{1k} + \phi_F) + 2\cos(\theta_2 + \phi_B) + \\ \cos(\theta_{3k} + \phi_F + \phi_B) + \cos(\theta_{4k} + \phi_F - \phi_B) \end{array} \right\} \quad (18)$$

By using the orthogonality of trigonometric functions, coefficients of cos φ B and sin φ B can be extracted as shown in Equations 19 and 20.

$$\frac{1}{8}\sum_k A_k\{2\cos\theta_2 + \cos(\theta_{3k} + \phi_F) + \cos(\theta_{4k} + \phi_F)\} = \quad (19)$$

$$\frac{1}{\pi}\int_0^{2\pi} I_S(\phi_F, \phi_B)\cos\phi_B d\phi_B$$

$$\frac{1}{8}\sum_k A_k\{-2\sin\theta_2 - \sin(\theta_{3k} + \phi_F) + \sin(\theta_{4k} + \phi_F)\} = \quad (20)$$

$$\frac{1}{\pi}\int_0^{2\pi} I_S(\phi_F, \phi_B)\sin\phi_B d\phi_B$$

From this, it is possible to express as follows by extracting the terms of cos φ B cos φ F, sin φ B sin φ F by Equations 21 and 22.

$$\frac{1}{8}\sum_k A_k\{\cos\theta_{3k} + \cos\theta_{4k}\} = \quad (21)$$

$$\frac{1}{\pi^2}\int_0^{2\pi}\int_0^{2\pi} I_S(\phi_F, \phi_B)\cos\phi_B\cos\phi_F d\phi_B d\phi_F$$

$$\frac{1}{8}\sum_k A_k\{-\cos\theta_{3k} + \cos\theta_{4k}\} = \quad (22)$$

$$\frac{1}{\pi^2}\int_0^{2\pi}\int_0^{2\pi} I_S(\phi_F, \phi_B)\sin\phi_B\sin\phi_F d\phi_B d\phi_F$$

Add these side by side, Equation 23 is obtained $$\frac{1}{8}\sum_k A_k\cos\theta_{4k} = \quad (23)$$

$$\frac{1}{2\pi^2}\int_0^{2\pi}\int_0^{2\pi} I_S(\phi_F, \phi_B)(\cos\phi_B\cos\phi_F + \sin\phi_B\sin\phi_F)d\phi_B d\phi_F$$

This eventually corresponds to extracting only the moire component in equation 17 as shown in equation 24.

$$\frac{1}{8}\sum_k A_k\cos\{2\beta(\delta_k - \delta_0)x\} = \quad (24)$$

$$\frac{1}{2\pi^2}\int_0^{2\pi}\int_0^{2\pi} I_S(\phi_F, \phi_B)\cos(\phi_B - \phi_F)d\phi_B d\phi_F$$

Figure 22:
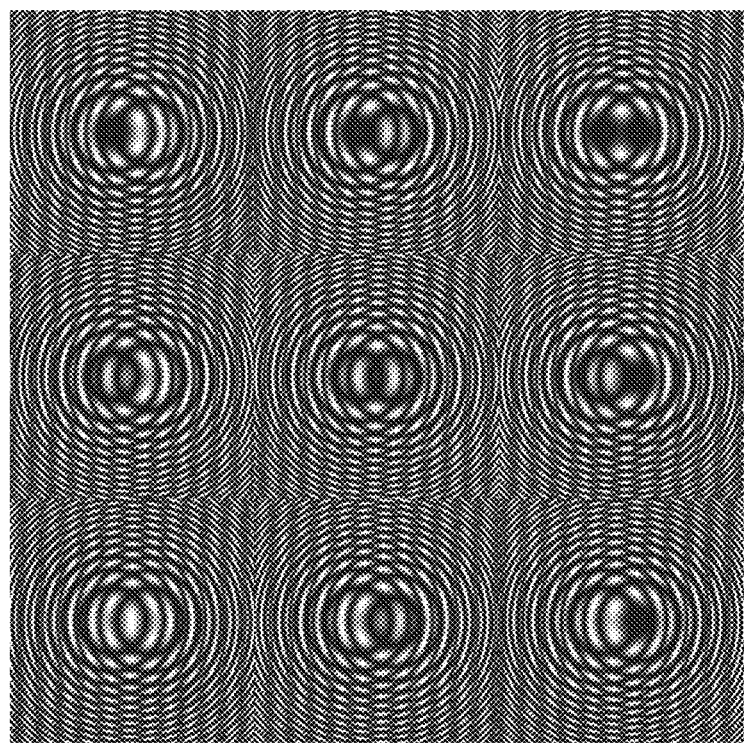
FIG. 22 is a diagram showing an image of a moiré fringe that is generated when light from a single point light source enters the 3×3 divided double-sided grating of embodiment 7.
Figure 23:
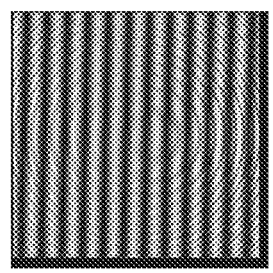
FIG. 23 is a diagram showing an image of moiré fringes obtained by noise reduction image processing according to embodiment 7.

This operation corresponds to scanning and integrating both the phase of the front side grating pattern 104 and the phase of the back side grating pattern 105 in two dimensions. In order to discretize this integration at three minimum sampling points, a 3×3 double-sided Fresnel zone plate described in FIGS. 20 and 21 is used. FIG. 22 shows Moiré fringes obtained by this 3×3 double-sided grating with a single point light source. A plurality of Fresnel zone plates appear to intersect, but this is a light intensity distribution formed in a sensor shape by light incident on the Fresnel zone plate on both sides without intersection. FIG. 23 shows a moiré fringe obtained by synthesizing the moiré fringes from each 3×3 cell by using the equation (24). Unnecessary noise other than moire fringes is greatly reduced. As a result, the quality of the captured image can be improved.

Embodiment 8

Figure 25:
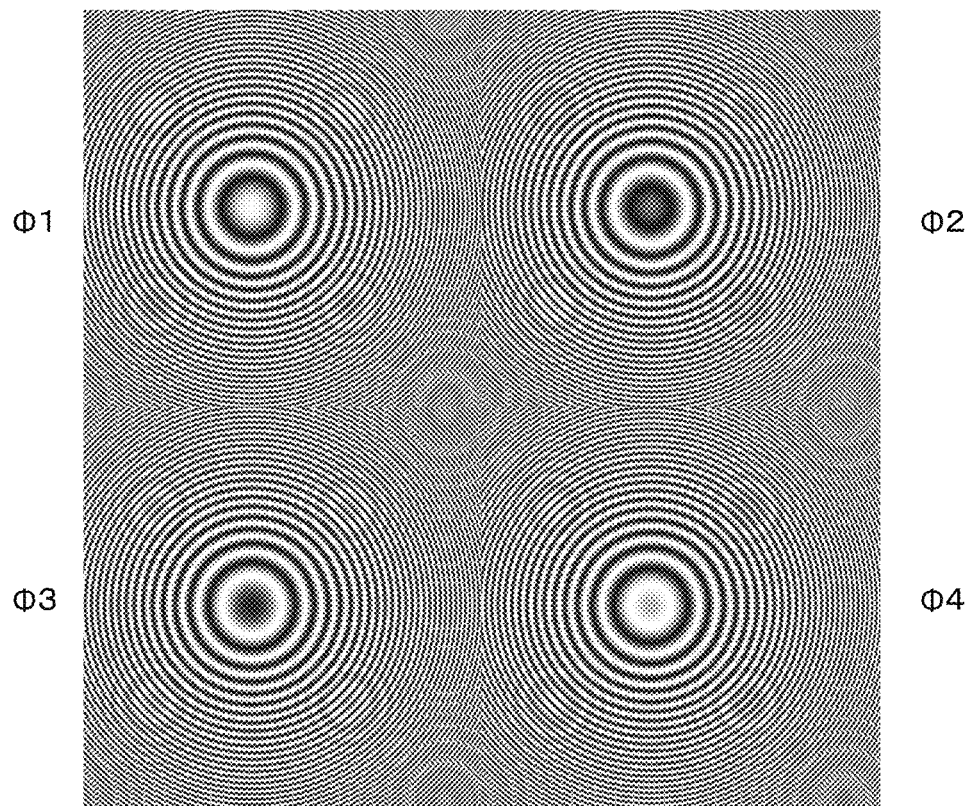
FIG. 25 is a diagram showing a grating pattern of an area of 2×2 division of embodiment 8.
Figure 26:
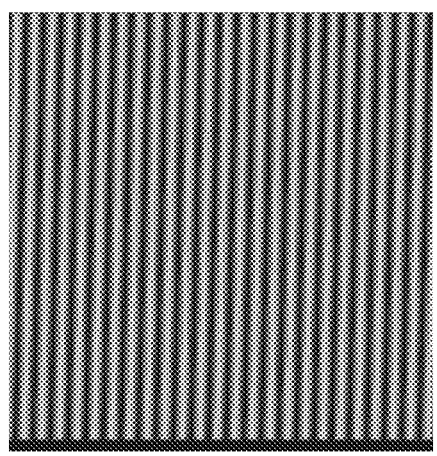
FIG. 26 is a diagram showing an image of moiré fringes obtained by performing noise reduction image processing according to embodiment 8.
Figure 27:
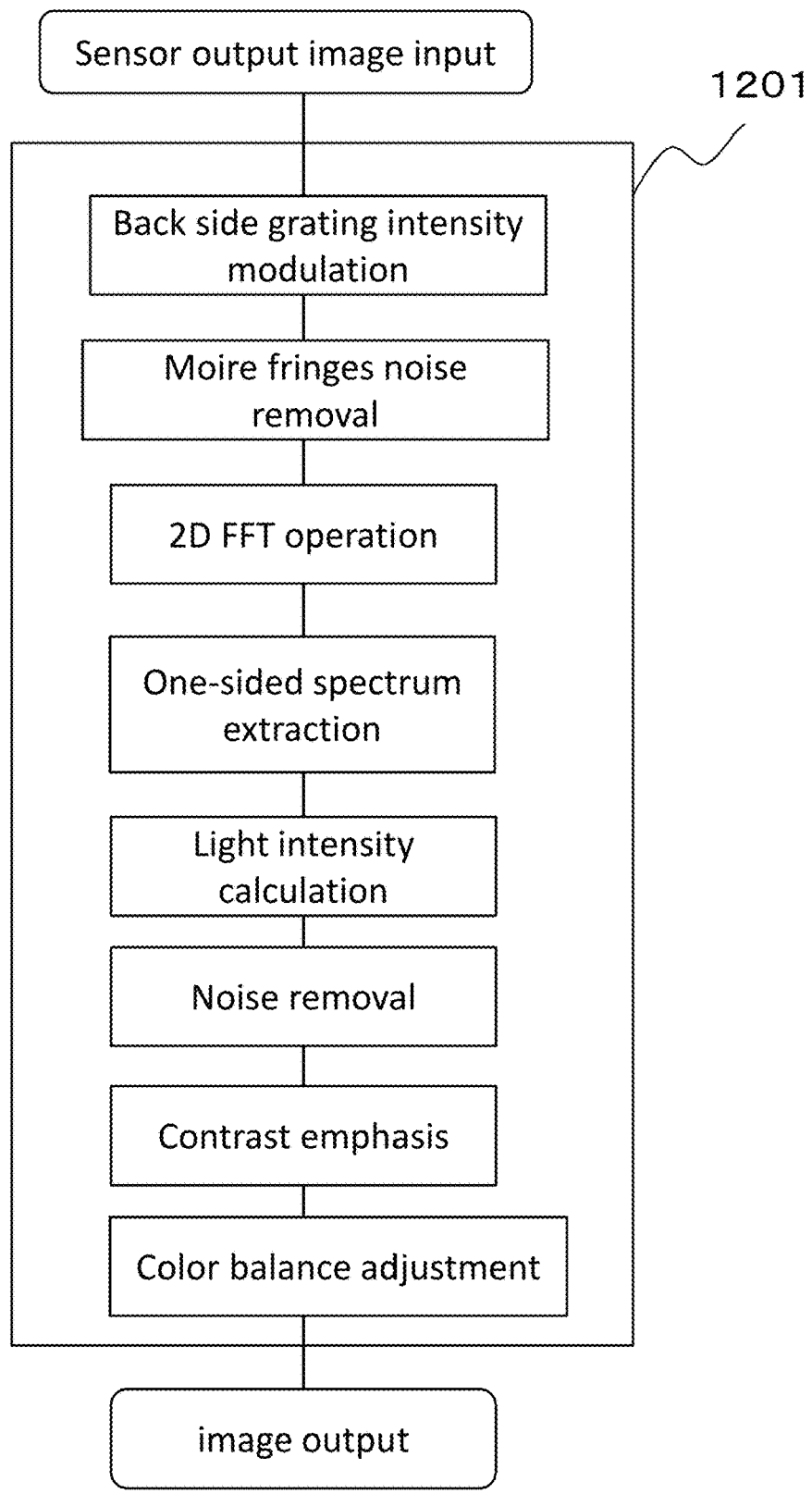
FIG. 27 is block diagram of the image processing circuit of Embodiment 8.

FIG. 25 shows another example of the front side grating pattern 104. A block diagram of the processing flow in the present embodiment is shown in FIG. 27, and a process of removing Moire fringe noise is added in comparison with FIG. 18. This is based on the assumption that the back side grating pattern 105 is not a fixed grating, but a sensor sensitivity is virtually given to the Fresnel zone plate shape or a liquid crystal element (or the like) is used. The front side grating pattern is divided into 2×2 areas, and the initial phase of each Fresnel zone plate is shifted by 90°. In the seventh embodiment, the phases are shifted in columns or rows, but in this embodiment the phase is different in all the regions. FIG. 26 shows a regenerated image of moiré fringes by a single point light source. Noise is further reduced as compared with FIG. 23. In this way, by making different the phase of the virtual zone plate on the back side by 4 steps in each phase by 90° in all regions and generating moiré fringes, it is possible to perform the integration operation in 4 phases on both side gratings. Further, as the division becomes smaller, further improvement of the noise reduction effect can be expected.

Embodiment 9

Figure 28:
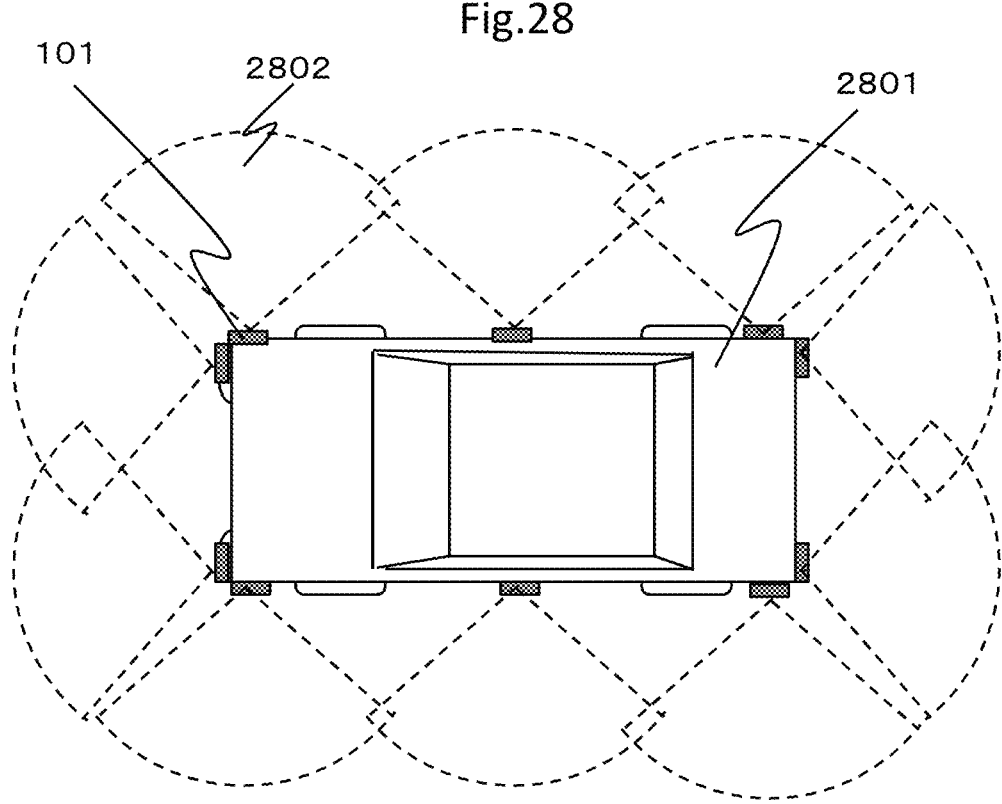
FIG. 28 is a diagram showing an embodiment of a vehicle in which the image device of the present invention is mounted as an in-vehicle camera.

FIG. 28 shows an embodiment in which the imaging device of the present invention is utilized for sensing 360° of the automobile 2801. Since the imaging device 101 of the present invention does not use a lens, it is expected to be thin, and strong against deviation and deterioration over time, and low in price. Therefore, it expected that many fields of view 2802 can be arranged so as to cover the entire area around the automobile, eliminating the blind spot of the driver, and contributing to the realization of a safe and secure society.

The present invention is not limited to the examples described above, but includes various modified examples. For example, the examples described above have been described in detail in order to explain the present invention in an easy-to-understand manner, and are not necessarily limited to those having all the configurations described.

Further, a portion of the configuration of a certain example can be replaced by the configuration of another example, and the configuration of another example can be added to the configuration of a certain example.

Further, it is possible to add, delete, and replace other configurations for a portion of the configuration of each example.

Each of the configurations, functions, processing units, processing means, and the like described above may be realized in hardware by designing a portion or all of them, for example, with an integrated circuit. Each of configurations, functions, and the like described above may be realized by software by allowing a processor to interpret and execute a program which realizes each function. Information such as a program, a table, a file or the like that realizes each function can be stored in a recording device such as a memory, a hard disk, a solid state drive (SSD), or a recording medium such as an IC card, an SD card, or a DVD.

Also, control lines and information lines indicate what is considered to be necessary for explanation, and all control lines and information lines are not necessarily indicated for products. In practice, it can be considered that almost all the configurations are mutually connected.

REFERENCE SIGNS LIST

101: imaging device
102: double-sided grating substrate
103: image sensor
104: front side grating pattern
105: back side grating pattern
106, 1201: image processing circuit
107: monitor display
201: subject
901: Integrated grating sensor substrate
1301: object point
1302: shadow of front grating pattern
1401: liquid crystal layer
1402: liquid crystal substrate
1403: variable grating
1501: cylindrical lens
1601: smartphone
1602: focus adjustment knob
2801: automobile

The invention claimed is:
1. An imaging device comprising:
a modulator for modulating an intensity of light using a first grating pattern,
an image sensor for converting the light transmitted through the modulator into an electric signal to generate a sensor image; and
an image processing unit that applies image processing to the signal output from the image sensor,
wherein the first grating pattern comprises a plurality of concentric circular patterns,
wherein the concentric circular pattern is composed of a plurality of concentric circles whose pitch becomes smaller in inverse proportion to the distance from center reference coordinates of the concentric circular pattern,
wherein the plurality of concentric circular patterns do not overlap with each other in the first grating pattern,
wherein the image processing unit performs a two-dimensional Fourier transform operation on the signal output from the image sensor,
wherein the modulator has a second grating pattern, and
wherein the modulator intensity-modulates light transmitted through the first grating pattern with the second grating pattern and outputs the light to the image sensor.
2. The imaging device according to claim 1,
wherein the second grating pattern is disposed on a surface so as to face a surface on which the first grating pattern is formed.
3. The image device according to claim 1,
wherein the image processing unit includes an intensity modulation unit that performs processing for virtually intensity modulating light transmitted through the first grating pattern, wherein the modulator outputs the light transmitted through the first grating pattern to the image sensor, and the image sensor outputs the captured image to the image processing unit, and wherein the intensity modulating unit performs a process of intensity modulating the light transmitted through the first grating pattern with respect to an image captured from the image sensor using a virtual second grating pattern.

4. The imaging device according to claim 3, wherein the intensity modulation unit intensity-modulates light transmitted through the first grating pattern by changing the size of the concentric circle of the virtual second grating pattern.

5. The imaging device according to claim 1, wherein the reference coordinate position of the first grating pattern and the reference coordinate position of the second grating pattern are deviated in mutually opposite directions with respect to an axis passing through the center of the image sensor and perpendicular to the light receiving side.

6. The imaging device according to claim 5, wherein the reference coordinate position of the first grating pattern and the reference coordinate position of the second grating pattern are shifted in the short side direction of the image output from the image processing unit.

7. The imaging device according to claim 1, wherein the first grating pattern is formed by a cylindrical lens.

8. The imaging device according to claim 1, wherein the first grating pattern is divided into a plurality of regions, and different concentric circular patterns are arranged for each region.

9. The imaging device according to claim 8, wherein phases of the concentric circular patterns are independent for the each region.

10. The imaging device according to claim 1, wherein the first grating pattern and the second grating pattern are divided into a plurality of regions, and the concentric circular patterns which are different between adjacent regions are arranged, and a combination of a phase of a grating of the plurality of regions in the first grating pattern and a phase of the plurality of regions in the second grating pattern are arranged so as to be overlapped by a plurality of combinations.

11. The imaging device according to claim 10, wherein the image processing unit performs an operation of extracting moire fringe components of the output image, and, the calculation is performed based on a combination of the phase of the plurality of regions in the first grating pattern and the phase of the plurality of regions in the second grating pattern.

12. An imaging device comprising:

a modulator for modulating an intensity of light using a first grating pattern, an image sensor for converting the light transmitted through the modulator into an electric signal to generate a sensor image, and an image processing unit that applies image processing to the signal output from the image sensor, wherein the modulator has a liquid crystal element displaying the first lattice pattern, wherein the first grating pattern comprises a plurality of concentric circular patterns, wherein the concentric circular pattern is composed of a plurality of concentric circles whose pitch becomes smaller in inverse proportion to the distance from center reference coordinates of the concentric circular pattern, and wherein the liquid crystal element can change the size of the concentric circles of the first grating pattern.

* * * * *